United States Patent
Bermano et al.

(10) Patent No.: US 9,691,165 B2
(45) Date of Patent: Jun. 27, 2017

(54) DETAILED SPATIO-TEMPORAL RECONSTRUCTION OF EYELIDS

(71) Applicant: Disney Enterprises, Inc., Burbank, CA (US)

(72) Inventors: Amit Bermano, Uster (CH); Thabo Beeler, Zurich (CH); Derek Bradley, Zurich (CH); Bernd Bickel, Vienna (AT); Markus Gross, Zurich (CH); Yeara Kozlov, Zurich (CH)

(73) Assignees: Disney Enterprises, Inc., Burbank, CA (US); ETH Zürich (Eidgenossische Technische Hochscule Zürich), Zürich) (CH)

( * ) Notice: Subject to any disclaimer, the term of this patent is extended or adjusted under 35 U.S.C. 154(b) by 8 days.

(21) Appl. No.: 14/809,122

(22) Filed: Jul. 24, 2015

(65) Prior Publication Data

US 2017/0024907 A1   Jan. 26, 2017

(51) Int. Cl.
G06K 9/00 (2006.01)
G06T 11/00 (2006.01)
G06T 7/00 (2017.01)

(52) U.S. Cl.
CPC .......... *G06T 11/003* (2013.01); *G06K 9/0061* (2013.01); *G06K 9/00604* (2013.01); *G06T 7/0075* (2013.01); *G06T 2207/10012* (2013.01); *G06T 2207/30196* (2013.01)

(58) Field of Classification Search
CPC ............... G06T 11/008; G06T 7/0075; G06T 2207/30196; G06T 2207/10012; G06T 7/0022; G06K 9/00604; G06K 9/0061; H04N 13/0239; H04N 2013/0081

USPC .......... 382/154, 100, 115, 117; 604/19, 289, 604/294, 300, 295; 340/575; 351/159.41
See application file for complete search history.

(56) References Cited

U.S. PATENT DOCUMENTS

| 7,436,987 | B2 * | 10/2008 | Takano | A61B 3/0025 348/78 |
|---|---|---|---|---|
| 8,064,648 | B2 * | 11/2011 | Takano | A61B 3/0025 382/117 |
| 8,249,695 | B2 * | 8/2012 | Grenon | A61B 3/10 600/407 |
| 8,255,039 | B2 * | 8/2012 | Gravely | A61B 3/10 600/407 |

(Continued)

OTHER PUBLICATIONS

Alexander, O., Fyffe, G., Busch, J., Yu, X., Ichikari, R., Jones, A., Debevec, P., Jimenez, J., Danvoye, E., Antionazzi, B., et al. 2013. Digital ira: creating a real-time photoreal digital actor. In ACM SIGGRAPH 2013 Posters.

(Continued)

*Primary Examiner* — Sheela C Chawan
(74) *Attorney, Agent, or Firm* — Kilpatrick Townsend & Stockton LLP

(57) ABSTRACT

Methods and systems of reconstructing an eyelid are provided. A method of reconstructing an eyelid includes obtaining one or more images of the eyelid, generating one or more image input data for the one or more images of the eyelid, generating one or more reconstruction data for the one or more images of the eyelid, and reconstructing a spatio-temporal digital representation of the eyelid using the one or more input image data and the one or more reconstruction data.

20 Claims, 26 Drawing Sheets
(4 of 26 Drawing Sheet(s) Filed in Color)

(56) References Cited

U.S. PATENT DOCUMENTS

| | | | | |
|---|---|---|---|---|
| 8,600,484 | B2* | 12/2013 | Grenon | A61B 3/10 600/407 |
| 8,900,143 | B2* | 12/2014 | Yen | A61B 3/16 600/398 |
| 9,195,890 | B2* | 11/2015 | Bergen | G06K 9/00617 |

OTHER PUBLICATIONS

Bando, Y., Kuratate, T., and Nishita, T. 2002. A simple method for modeling wrinkles on human skin. In Proc. Pacific Graphics.

Beeler, T., and Bradley, D. 2014. Rigid stabilization of facial expressions. ACM Trans. Graph. 33, 4 (July), 44:1-44:9.

Beeler, T., Bickel, B., Sumner, R., Beardsley, P., and Gross, M. 2010. High-quality single-shot capture of facial geometry. ACM Trans. Graphics (Proc. SIGGRAPH).

Beeler, T., Hahn, F., Bradley, D., Bickel, B., Beardsley, P., Gotsman, C., Sumner, R. W., and Gross, M. 2011. High-quality passive facial performance capture using anchor frames. ACM Trans. Graphics (Proc. SIGGRAPH) 30, 75:1-75:10.

Beeler, T., Bickel, B., Noris, G., Beardsley, P., Marschner, S., Sumner, R. W., and Gross, M. 2012. Coupled 3d reconstruction of sparse facial hair and skin. ACM Trans. Graph. 31, 4 (July), 117:1-117:10.

Berard, P., Bradley, D., Nitti, M., Beeler, T., and Gross, M. 2014. High-quality capture of eyes. ACM Trans. Graphics (Proc. SIGGRAPH Asia) 33, 6.

Bermano, A. H., Bradley, D., Beeler, T., Zund, F., Nowrouzezahrai, D., Baran, I., Sorkine-Hornung, O., Pfister, H., Sumner, R. W., Bickel, B., and Gross, M. 2014. Facial performance enhancement using dynamic shape space analysis. ACM Trans. Graphics 33, 2.

Bickel, B., Botsch, M., Angst, R., Matusik, W., Otaduy, M., Pfister, H., and Gross, M. 2007. Multi-scale capture of facial geometry and motion. ACM Trans. Graphics (Proc. SIGGRAPH), 33.

Bickel, B., Lang, M., Botsch, M., Otaduy, M. A., and Gross, M. 2008. Pose-space animation and transfer of facial details. In Proc. SCA, 57-66.

Botsch, M., and Sorkine, O. 2008. On linear variational surface deformation methods. Visualization and Computer Graphics, IEEE Transactions on 14, 1, 213-230.

Bouaziz, S., Wang, Y., and Pauly, M. 2013. Online modeling for realtime facial animation. ACM Trans. Graphics (Proc. SIGGRAPH) 32, 4, 40:1-40:10.

Bradley, D., Popa, T., Sheffer, A., Heidrich, W., and Boubekeur, T. 2008. Markerless garment capture. ACM Trans. Graphics (Proc. SIGGRAPH), 99.

Bradley, D., Heidrich, W., Popa, T., and Sheffer, A. 2010. High resolution passive facial performance capture. ACM Trans. Graphics (Proc. SIGGRAPH) 29, 41:1-41:10.

Brox, T., Bruhn, A., Papenberg, N., and Weickert, J. 2004. High accuracy optical flow estimation based on a theory for warping. In ECCV. Springer, 25-36.

Canny, J. 1986. A computational approach to edge detection. Pattern Analysis and Machine Intelligence, IEEE Transactions on, 6, 679-698.

Cao, X., Wei, Y., Wen, F., and Sun, J. 2012. Face alignment by explicit shape regression. In IEEE CVPR, 2887-2894.

Cao, C., Weng, Y., Lin, S., and Zhou, K. 2013. 3d shape regression for real-time facial animation. ACM Trans. Graphics (Proc. SIGGRAPH) 32, 4, 41:1-41:10.

Cao, C., Hou, Q., and Zhou, K. 2014. Displaced dynamic expression regression for real-time facial tracking and animation. ACM Trans. Graphics (Proc. SIGGRAPH) 33, 4, 43:1-43:10.

Cootes, T. F., Edwards, G. J., and Taylor, C. J. 2001. Active appearance models. IEEE Transactions on pattern analysis and machine intelligence 23, 6, 681-685.

Deng, Z., Lewis, J., and Neumann, U. 2005. Automated eye motion using texture synthesis. CGA 25, 2.

Dutreve, L., Meyer, A., and Bouakaz, S. 2011. Easy acquisition and real-time animation of facial wrinkles. Comput. Animat. Virtual Worlds 22, 2-3, 169-176.

Feng, W.-W., Yu, Y., and Kim, B.-U. 2010. A deformation transformer for real-time cloth animation. ACM Trans. Graphics (Proc. SIGGRAPH) 29, 4, 108:1-108:9.

François, G., Gautron, P., Breton, G., and Bouatouch, K. 2009. Image-based modeling of the human eye. IEEE TVCG 15, 5, 815-827.

Garrido, P., Valgaerts, L., Wu, C., and Theobalt, C. 2013. Reconstructing detailed dynamic face geometry from monocular video. In ACM Trans. Graphics (Proc. SIGGRAPH Asia), vol. 32, 158:1-158:10.

Ghosh, A., Fyffe, G., Tunwattanapong, B., Busch, J., Yu, X., and Debevec, P. 2011. Multiview face capture using polarized spherical gradient illumination. ACM Trans. Graphics (Proc. SIGGRAPH Asia) 30, 6, 129:1-129:10.

Huang, H., Chai, J., Tong, X., and Wu, H.-T. 2011. Leveraging motion capture and 3d scanning for high-fidelity facial performance acquisition. ACM Trans. Graphics (Proc. SIGGRAPH) 30, 4, 74:1-74:10.

Kahler, K., Haber, J., Yamauchi, H., and Seidel, H.-P. 2002. Head shop: Generating animated head models with anatomical structure. In Proc. SCA, 55-63.

Kim, D., Koh, W., Narain, R., Fatahalian, K., Treuille, A., and O'Brien, J. F. 2013. Near-exhaustive precomputation of secondary cloth effects. ACM Trans. Graphics (Proc. SIGGRAPH) 32, 4, 87:1-87:8.

Klaudiny, M., and Hilton, A. 2012. High-detail 3d capture and non-sequential alignment of facial performance. In 3DIMPVT.

Larboulette, C., and Cani, M.-P. 2004. Real-time dynamic wrinkles. In Proc. Computer Graphics Int., 522-525.

Le, B. H., Ma, X., and Deng, Z. 2012. Live speech driven head-and-eye motion generators. IEEE TVCG 18, 11, 1902-1914.

Lee, S. P., Badler, J. B., and Badler, N. I. 2002. Eyes alive. ACM Trans. Graphics (Proc. SIGGRAPH) 21, 3, 637-644.

Li, H., Yu, J., Ye, Y., and Bregler, C. 2013. Realtime facial animation with on-the-fly correctives. ACM Trans. Graphics (Proc. SIGGRAPH) 32, 4, 42:1-42:10.

Li, J., Xu, W., Cheng, Z., Xu, K., and Klein, R. 2015. Lightweight wrinkle synthesis for 3d facial modeling and animation. Computer-Aided Design 58, 0, 117-122.

Ma, W.-C., Hawkins, T., Peers, P., Chabert, C.-F., Weiss, M., and Debevec, P. 2007. Rapid acquisition of specular and diffuse normal maps from polarized spherical gradient illumination. In Eurographics Symposium on Rendering, 183-194.

Ma, W.-C., Jones, A., Chiang, J.-Y., Hawkins, T., Frederiksen, S., Peers, P., Vukovic, M., Ouhyoung, M., and Debevec, P. 2008. Facial performance synthesis using deformation-driven polynomial displacement maps. ACM Trans. Graphics (Proc. SIGGRAPH Asia) 27, 5, 121.

Magnenat-Thalmann, N., Kalra, P., Luc Leveque, J., Bazin, R., Batisse, D., and Querleux, B. 2002. A computational skin model: Fold and wrinkle formation. Trans. Info. Tech. Biomed. 6, 4, 317-323.

Müller, M., and Chentanez, N. 2010. Wrinkle meshes. In Proc. SCA, 85-92.

Perona, P., and Malik, J. 1990. Scale-space and edge detection using anisotropic diffusion. Pattern Analysis and Machine Intelligence, IEEE Transactions on 12, 7 (July), 629-639.

Peterson, M. F., and Eckstein, M. P. 2012. Looking justbelow the eyes is optimal across face recognition tasks. Proceedings of the National Academy of Sciences 109, 48.

Popa, T., Zhou, Q., Bradley, D., Kraevoy, V., Fu, H., Sheffer, A., and Heidrich, W. 2009. Wrinkling captured garments using space-time data-driven deformation. Computer Graphics Forum (Proc. Eurographics) 28,2, 427-435.

Rhee, T., Hwang, Y., Kim, J. D., and Kim, C. 2011. Real-time facial animation from live video tracking. In Proc. SCA.

Rohmer, D., Popa, T., Cani, M.-P., Hahmann, S., and Sheffer, A. 2010. Animation wrinkling: Augmenting coarse cloth simulations with realistic-looking wrinkles. ACM Trans. Graphics (Proc. SIGGRAPH Asia) 29,6, 157:1-157:8.

(56) References Cited

OTHER PUBLICATIONS

Ruhland, K., Andrist, S., Badler, J., Peters, C., Badler, N., Gleicher, M., Mutlu, B., and McDonnell, R. 2014. Look me in the eyes: A survey of eye and gaze animation for virtual agents and artificial systems. In Eurographics State of the Art Reports, 69-91.

Sagar, M. A., Bullivant, D., Mallinson, G. D., and Hunter, P. J. 1994. A virtual environment and model of the eye for surgical simulation. In Proceedings of Computer Graphics and Interactive Techniques, 205-212.

Seiler, M., Spillmann, J., and Harders, M. 2012. Enriching coarse interactive elastic objects with high-resolution data-driven deformations. In Proc. SCA, 9-17.

Shi, F., Wu, H.-T., Tong, X., and Chai, J. 2014. Automaticacquisition of high-fidelity facial performances using monocularvideos. ACM Trans. Graphics (Proc. SIGGRAPH Asia) 33.

Smith, M. L., Cottrell, G. W., Gosselin, F., and Schyns, P. G. 2005. Transmitting and decoding facial expressions. Psychological Science 16, 3,184-189.

Sorkine, O., and Alem, M. 2007. As-rigid-as-possible surface modeling. In Symposium on Geometry processing, vol. 4.

Suwajanakorn, S., Kemelmacher-Shlizerman, I., and Seitz, S. M. 2014. Total moving face reconstruction. In ECCV.

Trutoiu, L. C., Carter, E. J., Matthews, I., and Hodgins, J. K. 2011. Modeling and animating eye blinks. ACM Trans. Appl. Percept. 8, 3.

Valgaerts, L., Wu, C., Bruhn, A., Seidel, H.-P., and Theobalt, C. 2012. Lightweight binocular facial performance capture under uncontrolled lighting. ACM Trans. Graphics (Proc. SIGGRAPH Asia) 31, 6.

Wang, H., Hecht, F., Ramamoorthi, R., and O'Brien, J. F. 2010. Example-based wrinkle synthesis for clothing animation. ACM Trans. Graphics (Proc. SIGGRAPH) 29, 4, 107:1-107:8.

Warburton, M., and Maddock, S. 2015. Physically-based forehead animation including wrinkles. Comput. Animat. Virtual Worlds.

Weise, T., Bouaziz, S., Li, H., and Pauly, M. 2011. Realtime performance-based facial animation. ACM Trans. Graphics (Proc. SIGGRAPH) 30, 4, 77:1-77:10.

Weissenfeld, A., Liu, K., and Ostermann, J. 2010. Video-realistic image-based eye animation via statistically driven state machines. The Visual Computer 26, 9, 1201-1216.

Wu, C., Varanasi, K., Liu, Y., Seidel, H.-P., and Theobalt, C. 2011. Shading-based dynamic shape refinementfrom multi-view video under general illumination. In ICCV.

Zhang, Y., Sim, T., and Tan, C. 2005. Simulating wrinkles in facial expressions on an anatomy-based face. In Proc. ICCS, 207-215.

Zurdo, J. S., Brito, J. P., and Otaduy, M. A. 2013. Animating wrinkles by example on non-skinned cloth. IEEE TVCG 19,1, 149-158.

\* cited by examiner

DETAILED SPATIO-TEMPORAL RECONSTRUCTION OF EYELIDS

FIELD

The present disclosure generally relates to a spatio-temporal reconstruction of an object, such as an eyelid. For example, an eyelid is reconstructed, which can include one or more wrinkles, for use in rendering an animation of the eyelid.

BACKGROUND

Eyes can be used to convey and express emotion. However, it can be challenging to capture aspects of the eye region, including an eyelid, in three-dimensional (3D) modeling. Specifically, it can be difficult to produce an accurate 3D representation of an eyelid. Digital representations or digital doubles of a subject can be used in, for example, movies and video games.

FIG. 1 illustrates an example of human eyelids. As shown in FIG. 1, a subject 100, such as an actor, has two upper eyelids 110 and two lower eyelids 120 in their eye region. In order to create a digital representation of, for example, an actor's eyelid, an expressive performance of the actor's eye region is obtained. An expressive performance can include a series of movements representing a facial expression and can represent a subject smiling, laughing or blinking. An expressive performance can capture a subject's facial expression for a particular period of time, such as a few seconds or a few minutes. An expressive performance can include various aspects of the eye region that can be used to create a digital representation of the eye region.

However, in an expressive performance, an eyelid can undergo deformation and wrinkling. The skin on the eyelid rolls and folds inward when the eye opens, and stretches over the eyeball when the eye is shut. Due to concavities and eyelashes, this can result in significant self-shadowing, inter-reflections, and partial occlusions. In some facial expressions a significant part of the eyelid is folded in and not visible at all. A labor intensive manual process may be used to create digital representations of eyelids.

SUMMARY

The exemplary embodiments can provide methods and devices for providing a spatio-temporal reconstruction of an object, such as an eyelid.

In accordance with an exemplary embodiment, a computer-implemented method of reconstructing an eyelid includes obtaining one or more images of the eyelid, generating one or more image input data for the one or more images of the eyelid, generating one or more reconstruction data for the one or more images of the eyelid, and reconstructing a spatio-temporal digital representation of the eyelid using the one or more input image data and the one or more reconstruction data.

In accordance with an exemplary embodiment, the reconstructing the spatio-temporal digital representation of the eyelid includes tracking a visible skin area of the eyelid, and generating a plausible wrinkle area of the eyelid.

In accordance with an exemplary embodiment, the one or more image input data includes one of a depth map data, a wrinkle probability data, an optical flow data, and a tracked contour data.

In accordance with an exemplary embodiment, the one or more reconstruction data includes one of an eyelid mesh data and a face mesh data.

In accordance with an exemplary embodiment, the tracking the visible skin area of the eyelid includes deforming the eyelid using one of the optical flow data and the tracked contour data from the one or more image input data.

In accordance with an exemplary embodiment, the generating the plausible wrinkle area of the eyelid includes determining wrinkle feature points of the eyelid by traversing a wrinkle-cross section.

In accordance with an exemplary embodiment, the wrinkle feature points include a top of the wrinkle, a bottom of the wrinkle, a front-buckle of the wrinkle, a back-buckle top of the wrinkle and a back-buckle bottom of the wrinkle.

In accordance with an exemplary embodiment, the method of reconstructing the eyelid includes generating a wrinkle probability map for the one or more images to create the wrinkle probability data, and the wrinkle probability map is configured to identify a probable location of a wrinkle on the eyelid.

In accordance with an exemplary embodiment, the method of reconstructing the eyelid includes generating a source-sink map which is configured to identify an optical flow density, and correcting the optical flow computed from the one or more images using the source-sink map and the wrinkle probability map.

In accordance with an exemplary embodiment, the tracked contour data is determined by generating a plurality of reference contours, and tracking a contour of the eyelid for the one or more images using at least one of the plurality of reference contours to generate the tracked contour data.

In accordance with an exemplary embodiment, the generating the plausible wrinkle area of the eyelid includes resolving a self-intersection.

In accordance with an exemplary embodiment, a system for reconstructing an eyelid includes a memory storing a plurality of instructions, and one or more processors configured to obtain one or more images of the eyelid, generate one or more image input data for the one or more images of the eyelid, generate one or more reconstruction data for the one or more images of the eyelid; and reconstruct a spatio-temporal digital representation of the eyelid using the one or more input image data and the one or more reconstruction data.

In accordance with an exemplary embodiment, a computer-readable memory storing a plurality of instructions executable by one or more processors, the plurality of instructions include instructions that cause the one or more processors to obtain one or more images of the eyelid, instructions that cause the one or more processors to generate one or more image input data for the one or more images of the eyelid, instructions that cause the one or more processors to generate one or more reconstruction data for the one or more images of the eyelid, and instructions that cause the one or more processors to reconstruct a spatio-temporal digital representation of the eyelid using the one or more input image data and the one or more reconstruction data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of the exemplary embodiments. However, it will be apparent that various embodiments may be practiced without these specific details. The figures and description are not intended to be restrictive.

In visual effects, it is desirable to accurately represent and capture features when producing animation. However, it can be difficult to accurately represent the face, especially the eyelid region. An eyelid can undergo skin deformation and wrinkling. The skin on the eyelid rolls and folds inward when the eye opens, and stretches over the eyeball when the eye is shut. In some facial expressions a significant part of the eyelid is folded in and not visible at all. Also, due to concavities and eyelashes, this can result in significant self-shadowing, inter-reflections, and partial occlusions. Occlusions can occur when a part of the eyelid becomes occluded or obstructed. Self-shadowing can occur when the eyelashes create shadows or occlude a part of the eyelid located behind the eyelashes. Inter-reflections can occur when, for example, light hits a top eyelid and the light is reflected down on a lower part of the eyelid.

Therefore, an exemplary embodiment provides a method for accurately representing eyelids of a subject. The eyelid representation of a subject can be used to create, for example, a digital double of the eyelids of the subject, which is a digital representation of the eyelids of the subject. The exemplary embodiments can reconstruct the eyelid of the subject while taking into account temporal differences and deformations in the eyelid of the subject.

I. Overview of System

Figure 1:
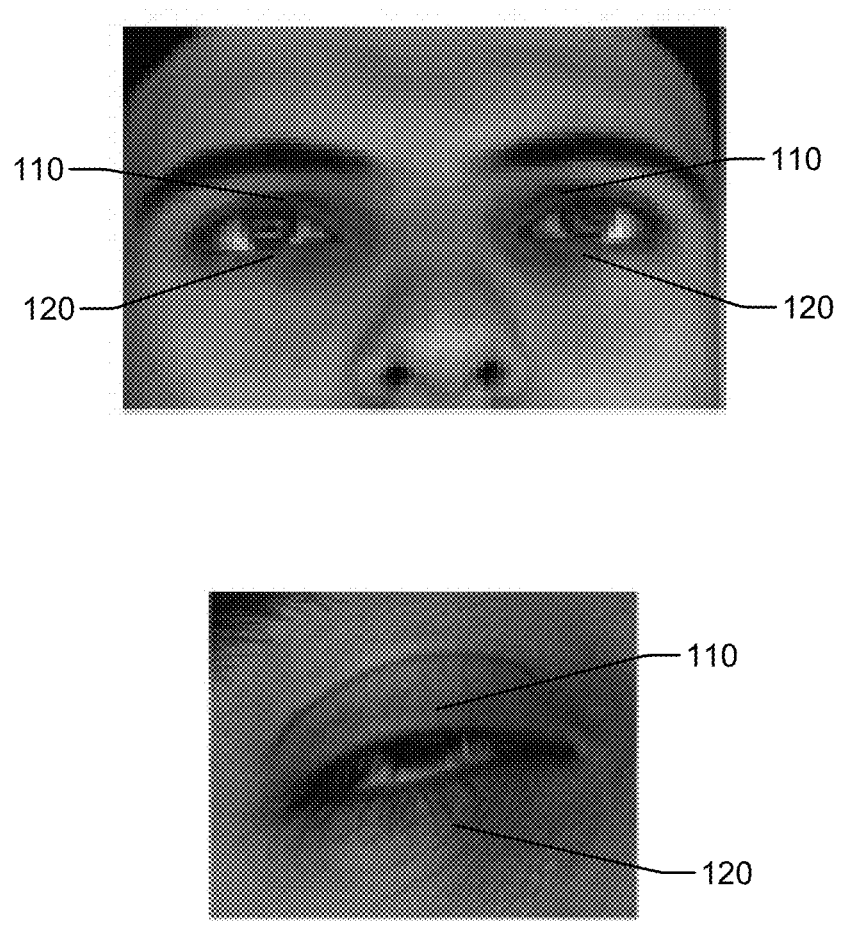
FIG. 1 illustrates an example of human eyelids.
Figure 2:
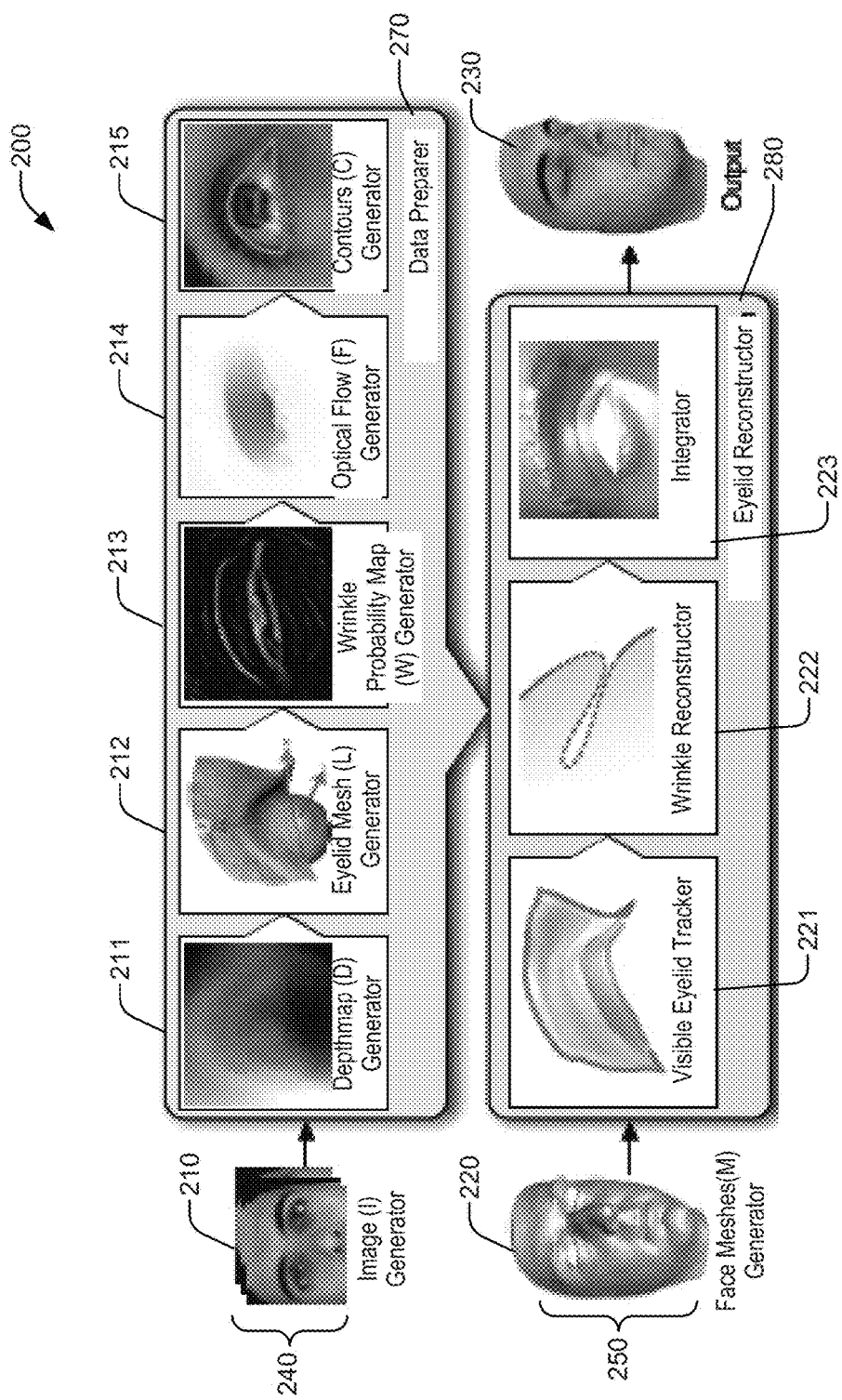
FIG. 2 illustrates an overview of a system for reconstructing an eyelid, in accordance with an exemplary embodiment.

FIG. 2 illustrates an overview of a system 200 for reconstructing an eyelid, in accordance with an exemplary embodiment. As shown in FIG. 2, after acquiring image data, data preparation and eyelid reconstruction are performed in order to produce, for example, a face with an accurate representation of a subject's eyelids.

As shown in FIG. 2, a data preparer 270 of the exemplary system can include a depth map generator 211, an eyelid mesh generator 212, a wrinkle probability map generator 213, an optical flow generator 214 and a contours generator 215. An eyelid reconstructor 280 of the exemplary system can include a visible eyelid tracker 221, a wrinkle reconstructor 222 and an integrator 223. The system of FIG. 2 is merely exemplary and a system for reconstructing an eyelid can include additional or fewer elements. Further, the order of the elements can be modified as desired by a user of the system.

An image generator 210 can be used to obtain one or more images of an eye region. As shown in FIG. 2, one or more images 240 of an eye region of a subject are captured and processed in order to produce an accurate representation of a face of the subject including eyelids of the subject. The subject can be, for example, an actor.

The images 240 are based on a captured performance of the eyes. The performance can be captured using one or more cameras. One or more cameras which are capable of capturing an image, such as an off-the shelf camera, can be used to capture the performance of the eye region. The performance of the eye region can include movement of the eye region and changes in expression of the eye region.

In an exemplary embodiment, the images of the actor's eyelids are captured over a period of time. The period of time can be designated by a user. The period of time can vary as desired by a user and based on features of the eyelid for reconstruction. During the predetermined time, the eyelids can open and close. When the eyelids open and close wrinkles can be formed.

After obtaining one or more images 240 of the eye region by the image generator 210, data preparation is performed in data preparer 270. Data preparer 270 can include a depth map generator 211, an eyelid mesh generator 212, a wrinkle probability map generator 213, an optical flow generator 214 and a contours generator 215.

The depth map generator 211 analyzes one or more of images 240 to remove eyelashes and generates a spatiotemporal reconstruction of the face shape along with per frame depth maps. A frame is one image in time. The depth map generator 211 generates a depth map by computing a depth between pixels in an image and a camera. The brightness and darkness in the depth map can indicate whether a pixel in the image is close or far away from a camera.

Eyelid mesh generator 212 creates an eyelid mesh or a template eyelid mesh for one or more eyelids of a subject which are to be reconstructed. A mesh can be used for geometric representations in computer graphics. A mesh can consist of a set of points which have a connection to each other. A mesh can be used to create a surface which can describe, for example, a face or eyelids. Also, a mesh can be in the form of a triangle or other shapes, as desired by a user.

Eyelid mesh generator 212 can create an eyelid mesh for, for example, the four eyelids of the subject (two upper eyelids and two lower eyelids). The eyelid mesh is created and will be continuously deformed from frame to frame. The eyelid mesh can be created manually by a user. A user can draw on an image of an eye and identify one or more eyelid regions on the eye in order to create an eyelid mesh. A reference coordinate frame can also be created.

Wrinkle probability map generator 213 generates a wrinkle probability map. The acquired images 240 can be processed with an algorithm according to an exemplary embodiment. The wrinkle probability map can indicate where one or more wrinkles are most likely to form. That is, the wrinkle probability map can identify a probable location of one or more wrinkles on an eyelid.

Optical flow generator 214 computes optical flow. Computing optical flow can include motion tracking from one time step to a next time step. For example, if there are two images 240 obtained from a video of a performance, visible points on the eyelids can be tracked. The location of visible points of the eyelid from one frame to a next frame of the video is determined. Optical flow, which is computed frame by frame, can be misled by skin wrinkling. Therefore, the optical flow can be corrected using a wrinkle probability map, such as that which was computed by wrinkle probability map generator 213.

Contour generator 215 tracks eyelid contours over time. Eyelid contours are tracked over time to ensure a faithful reconstruction of the interface between the eyelid and the eye. The interface between the eye and eyelid is visually important for providing an accurate representation of the eye region. Eyelid tracking can be performed by deforming a visible part of the eyelid using constraints from optical flow, tracked eyelid contours and a surrounding face mesh. The eyelid contours can include inner eyelid contours and outer eyelid contours. The contours can be used to indicate where the eyelid ends and where the eye starts.

After the eyelid data has been prepared, eyelid reconstruction is performed. Eyelid reconstructor 280 can include a visible eyelid tracker 221, a wrinkle reconstructor 222, and an integrator 223.

A mesh of a face 250 can be obtained by a face mesh generator 220. The mesh of the face 250 can be combined with one or more meshes of the eyelid in order to generate a digital double of the actor's face 230.

Visible eyelid tracker 221 tracks an eyelid where is it visible. The tracking can be performed using the optical flow computed by optical flow generator 214 and the depth map computed by depth map generator 211. For locations where the eyelid is not visible, a location of wrinkles can be identified based on a wrinkle probability map that can be generated by wrinkle probability map generator 213.

Wrinkle reconstructor 222 reconstructs wrinkles. The parts of the eyelid, which are subject to wrinkling and are thus not visible, are reconstructed. The wrinkle reconstructor 222 produces plausible wrinkles that are a visually accurate representation of an eyelid.

Integrator 223 integrates the mesh of the face with the reconstructed eyelid to create an accurate representation of the face including the eyelids 230. The eyelid meshes are used as control meshes to deform the face mesh which results in a complete facial performance with accurately tracked eyelids. That is, an animation 230 is produced which is of a complete facial performance with accurately tracked eyelids.

Although the example shown in FIG. 2 is with respect to a human face, specifically, the eyelid area of a human face, the exemplary system and method can be applied to an eyelid area belonging to, for example, an animal. Further, although the exemplary embodiment produces a human face, the exemplary technique can be used to produce different animations other than a human face. Also, the reconstructed eyelid can be used independently and does not need to be combined with a face.

A. Data Preparation

Prior to reconstructing the eyelid, input data is generated and prepared. As discussed above, in order to create the reconstructed eyelid, images of the eye region of an actor are acquired. The images that are acquired are based on a captured performance of the eye region, specifically, the eyelids. The images, including the eyelids, are captured over time.

1. Data Acquisition

Figure 3:
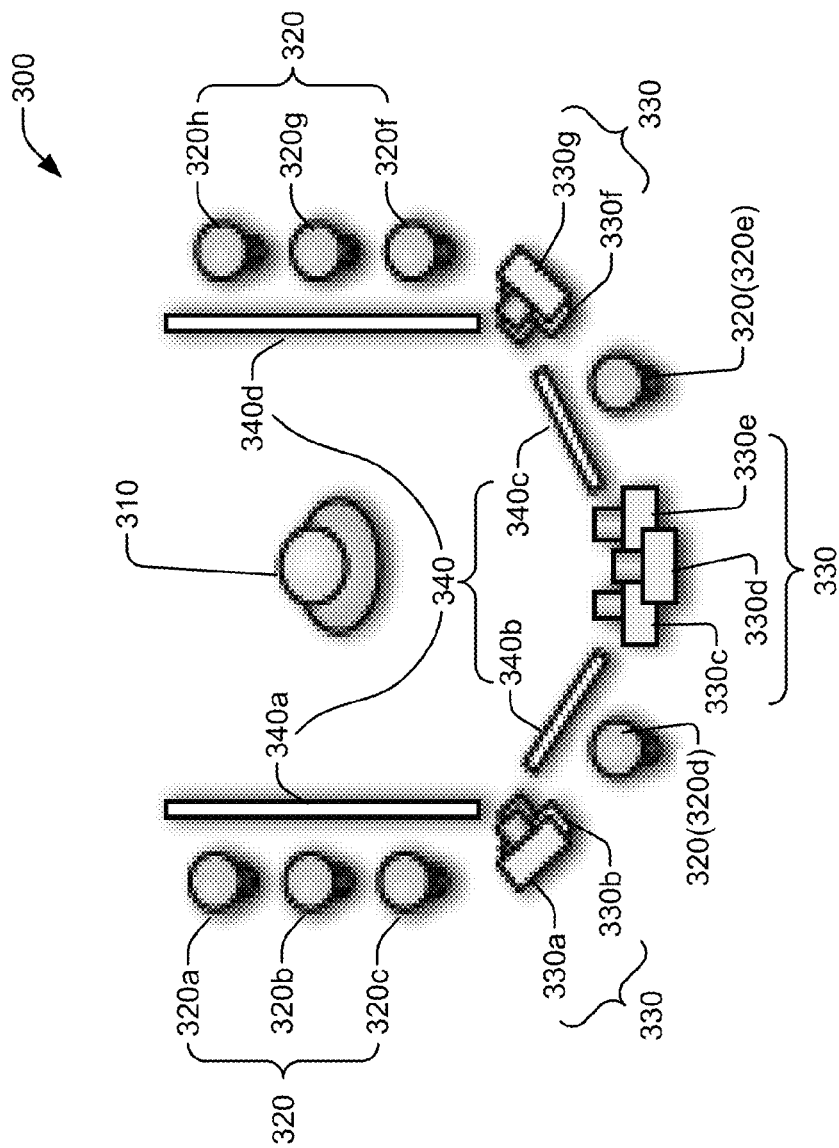
FIG. 3 illustrates an example configuration of a system for obtaining one or more images, in accordance with an exemplary embodiment.
Figure 4:
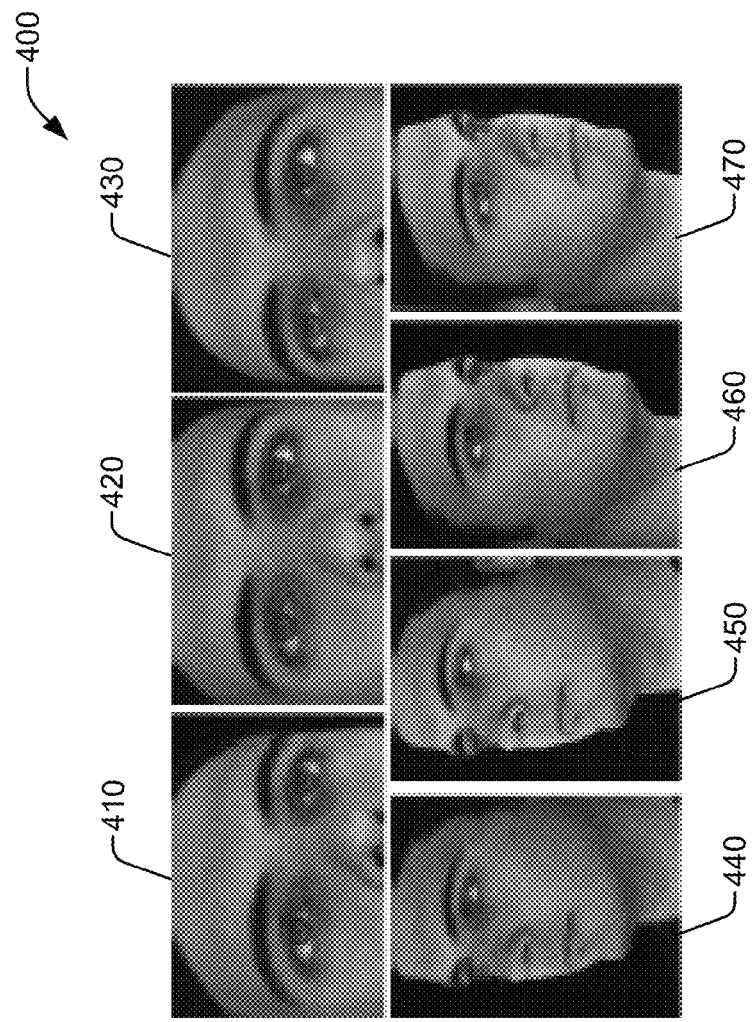
FIG. 4 illustrates a plurality of images which are obtained from an exemplary system, in accordance with an exemplary embodiment.

FIG. 3 illustrates an example configuration of a system for obtaining one or more images, in accordance with an exemplary embodiment. FIG. 4 illustrates a plurality of images which are obtained from an exemplary system, in accordance with an exemplary embodiment.

Images are acquired to create a reconstructed eyelid of an actor. In order to obtain the images, a performance of the eyes is captured. A high-resolution facial performance capture is obtained. For example, as an actor sits in front of the camera, the movement of the eyes is captured over time to create a series of images. The performance can be captured using one or more off-the-shelf cameras or one or more cameras that are readily available to a user. In an exemplary embodiment, the images of the eyelids are captured over time. The performance can include opening and closing of the eyelid which can be used to create a digitally accurate representation of the eyelid.

As shown in FIG. 3, the system 300 for acquiring one or more images can include one or more cameras 330, one or more LED strips 320, and one or more diffusors 340. The system 300 for acquiring one or more images can correspond to the image generator 210 of FIG. 2. The cameras 330 can be, for example, a video camera. In the example shown in FIG. 3, a subject 310, such as an actor, is positioned in front of one or more cameras 330.

Seven cameras 330a, 330b, 330c, 330d, 330e, 330f and 330g are shown in FIG. 3. Although seven cameras 330a-330g are shown in FIG. 3, a single camera can be used to obtain one or more images of the eye region. As shown in FIG. 4, the images 400 are of different views of the eye region of the subject 310 based on the position of the camera 330 from the subject 310.

For purposes of providing illumination, LED strips 320 can be mounted on a cage (not shown) around the actor 310. Eight LED strips 320a, 320b, 320c, 320d, 320e, 320f, 320g, and 320h are shown in FIG. 3. However, more than eight or less than eight LED strips 320 can be used. Alternatively, an LED strip does not need to be used in order to obtain the one or more images.

The LED strips 320 are diffused by a diffusor 340. The diffusor 340 can be, for example, frosted paper. The LED strips 320 mounted around the actor can be diffused by frosted paper that provides a flat illumination. Four diffusors 340a, 340b, 340c, and 340d are shown in FIG. 3. However, more than four or less than four diffusors 340 can be used. Alternatively, a diffusor 340 does not need to be used in order to obtain the one or more images.

The seven cameras 330a-330g are synchronized and each of the seven cameras 330a-330g can provide about 40 frames per second at about 1 MP. In an exemplary embodiment, cameras 330c, 330d, and 330e are zoomed toward the eye region of the subject 310 in order to obtain high resolution images 410, 420, and 430 of the eye region. Four cameras 330a, 330b, 330f, and 330g can be split into pairs to obtain high resolution images of the face 440, 450, 460 and 470. Since seven cameras 330a-330g are used in the example shown in FIG. 3, seven images 400 are obtained from the seven cameras 330. The seven images 400 shown in FIG. 4 are captured at one point in time. Therefore, the seven images 400 represent a dataset for one frame. Although seven images 400 are shown, the exemplary embodiments are not limited to the example shown in FIGS. 3 and 4.

The system 300 for acquiring the images can be a light-weight system since it does not require a lot of components in order to create an active setup. One or more cameras which are capable of obtaining a high-resolution image can be used. Although several images are obtained, a single high-resolution image can be used to reconstruct an eyelid.

2. Face Mesh Reconstruction

One or more eyelids, which are reconstructed according to an exemplary embodiment, can be integrated with a face mesh. Face mesh generator 220 can generate a face mesh 250 that can be integrated with a reconstructed eyelid. A spatio-temporal shape of a face of the subject 310 can be reconstructed from the images which are generated by image generator 210. The spatio-temporal shape of the face can be reconstructed using a method as described in Beeler et al., "*High-Quality passive facial performance capture using anchor frames,*" ACM Trans. Graphics (Proc. SIGGRAPH) 30, 75:1-75:10 (2011). A high-resolution per-frame tracked mesh in dense correspondence can thus be generated.

In addition to generating the per-frame tracked mesh, a depth map can also be computed for the eyes. A per-frame depth map D can be computed by depth map generator 211. Per-frame depth maps D can be computed using a method described in Beeler et al. "*High-quality single-shot capture of facial geometry.*" ACM Trans. Graphics (Proc. SIGGRAPH) (2010). The depth maps can provide information in areas not covered by the tracked meshes, such as the eyes.

Eyelashes can occlude the skin underlying the eyelashes and can confuse stereo matching when performing stereo-based reconstruction. This can result in considerable artifacts in the reconstructed depth maps. Therefore, in an exemplary embodiment, the eyelashes of the eyelid are removed by an inpainting method.

Figure 5:
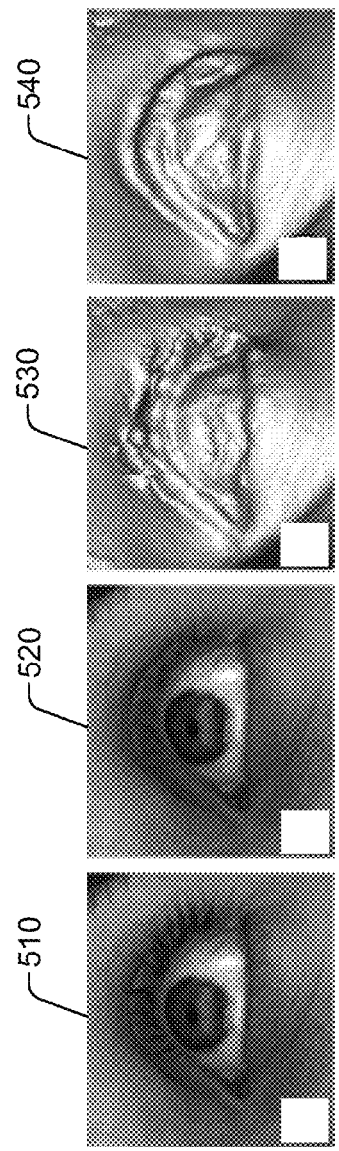
FIG. 5 illustrates a method of performing inpainting, in accordance with an exemplary embodiment.

FIG. 5 illustrates a method of performing inpainting, in accordance with an exemplary embodiment. FIG. 5 illustrates an input image 510 of an eye region of a subject, an image 520 after the eyelashes of the subject have been removed, a reconstructed eyelid geometry 530 including artifacts, and a reconstructed eyelash geometry 540 after inpainting has been performed.

Inpainting is a process of reconstructing lost or deteriorated parts of images and videos. Fine hair structures, such as eyelashes, can be removed. As shown in image 510, the eyelids of the subject includes eyelashes. The reconstructed geometry image 530 includes artifacts because of the eyelashes since the eyelashes occlude the skin on the eyelid.

In image 540, inpainting is performed which improves the reconstructed geometry of the eyelids. An inpainting method such as that disclosed in Beeler et al. "*Coupled 3D reconstruction of sparse facial hair and skin,*" ACM Trans. Graph 31, 4 (July) 117:1-114:10 (2012) can be used to remove the eyelashes from the input images before reconstruction. When the eyelashes are removed, areas such as "holes" appear in the location of the removed eyelashes. The holes, which appear after removing the eyelashes, are filled by performing inpainting. The holes are filled by propagating color values from neighboring pixels which have not been removed. Therefore, the holes are filled with color from surrounding pixels.

3. Eyelid Initialization

Figure 6:
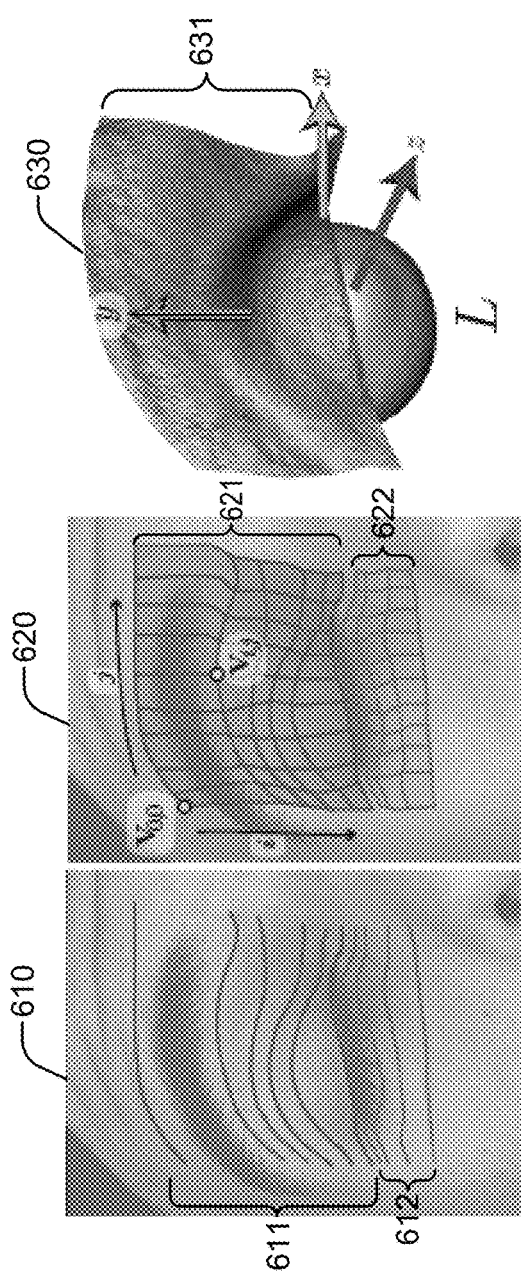
FIG. 6 illustrates an example of creating a template mesh for an eyelid, in accordance with an exemplary embodiment.

During data preparation, an eyelid mesh can be generated which can then be used during eyelid reconstruction. FIG. 6 illustrates an example of creating a template mesh for an eyelid, in accordance with an exemplary embodiment. FIG. 6 includes an image 610 showing curves which are drawn on an eyelid, an image 620 showing a 2D grid which is generated based on the drawn curves, and an image 630 showing a 3D eyelid mesh.

A template mesh can be modeled in 3D. However, familiarity in 3D modelling would be required. Therefore, an alternative to 3D modeling can be used as shown in FIG. 6.

A template mesh (L) or an eyelid mesh can created for each of the four eyelids of a subject as desired for reconstruction. That is, a template mesh can be created for an upper left eyelid, a lower left eyelid, an upper right eyelid and a lower right eyelid of a subject. Therefore, the eyelid area can be efficiently processed in order to detect and reconstruct wrinkles. The template mesh can be manually created.

The template meshes include a regular grid of vertices $v_{i,j}$ in which the rows i are aligned with a predominant wrinkle orientation and the columns j run orthogonal across the wrinkles. For example, wrinkles can form on an eyelid horizontally over the eye. As the subject opens or closes their eye, the eyelid wrinkles horizontally over the eye, which can be the predominant wrinkle orientation.

As shown in image 610 of FIG. 6, curves 611 can be drawn on an upper eyelid and curves 612 can be drawn on a lower eyelid. The curves 611 and 612 can be generated manually by a user. In the example shown in FIG. 6, the curves are drawn on an image of the eyelid area in which the eye region is in a "rest pose." The rest pose is a position in which the eyes of the subject are closed and the eyebrows are raised. Although a rest pose is described, the exemplary embodiments are not limited to the creation of an eyelid mesh in a rest pose and other poses can be used.

As shown in image 620, a 2D grid is created from the curves 621 of the upper eyelid and from the curves 622 of the lower eyelid. The origin of the grid is $v_{0,0}$ in the top left corner. The rows i run down and the columns j run to the right.

From the 2D grid which was created in image 621, a 3D eyelid mesh 631 is created as shown in image 630. The 3D eyelid mesh can be created using the computed depth maps. The user created eyelid mesh, which is created by a combination of manual and computer input, can be projected onto a depth map to produce a 3D shape as shown in image 630. The eyelid mesh can be of a quadrilateral shape and can be made up of rectangles.

A user can also initialize a reference coordinate frame, approximately in the center of the eye socket, with the z-axis pointing forward and the y-axis pointing upward as shown in image 630. The coordinate frame follows the rigid head motion computed by rigid stabilization such as that disclosed in Beeler et al. "*Rigid stabilization of facial expressions*," ACM Trans. Graph. 33, 4 (July), 44:1-44:9 (2014) and is used to both reconstruct the eyelid wrinkles and to compute the wrinkle probability map.

4. Wrinkle Probability Map

In an exemplary embodiment, a wrinkle probability map is computed for a frame from inpainted and histogram normalized images using oriented kernels. A wrinkle probability map or wrinkle map indicates where wrinkles are likely to form. The wrinkle probability map encodes the likelihood that a pixel of an image is part of a wrinkle. When a wrinkle appears on a subject's skin, such as an eyelid, they often occur in the same location. There is a high probability that a wrinkle will occur in a location it has previously occurred before. Therefore, an exemplary embodiment identifies areas which have an increased wrinkle probability.

Figure 7:
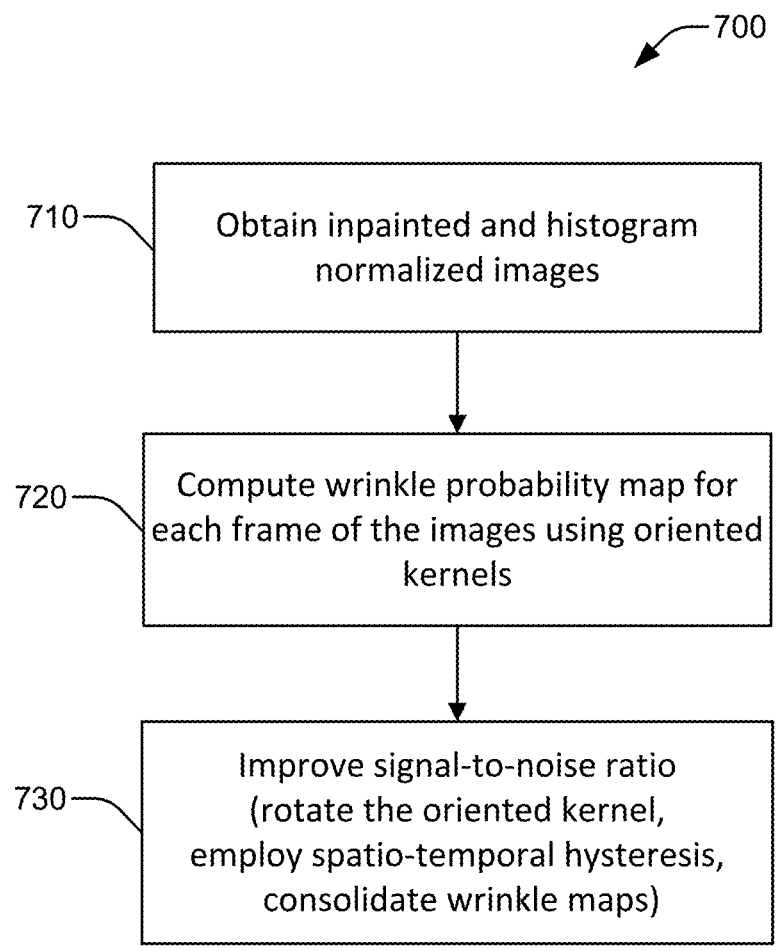
FIG. 7 illustrates a method of creating a wrinkle probability map, in accordance with an exemplary embodiment.

FIG. 7 illustrates a method 700 of creating a wrinkle probability map, in accordance with an exemplary embodiment. As shown in FIG. 7, at step 710 inpainted and normalized images are obtained. One or more images can be used. The images which are used can be images of a subject which were acquired by the system 300 of acquiring images, as described in FIGS. 3 and 4. The images can be inpainted using a method such as that disclosed in FIG. 5. Normalization is a process that changes the range of pixel intensity values. That is, the image is brought into a normal range of pixel intensity values.

At step 720, a wrinkle probability map W is computed for each frame of the images using oriented kernels. That is, anisotropic differences of Gaussians $N(\sigma_x, \sigma_y, \theta) - N(\sigma_x)$ for seven different orientations $\theta$ in the range of $\pm 20°$ are used where $\sigma_x = 8$ and $\sigma_y = 0.1\sigma_x$. The maximum response is recorded in a wrinkle probability map. Other oriented kernels such as Gabor can also be used. The computed wrinkle probability map can be used to identify wrinkles in each frame of the images.

While identifying wrinkles, noise caused by areas having a similar appearance may be captured. Therefore, at step 730, the signal-to-noise ratio is improved. The wrinkles of interest, that is the wrinkles of the subject that are to be identified for reconstruction, tend to form concentrically around the center of the eyes in an image. In order to improve the signal-to-noise ratio the following steps can be performed.

First, the oriented kernel is rotated based on a relative position of the oriented kernel to the closest eye center. Second, a spatio-temporal hysteresis is employed. An example spatio-temporal hysteresis is that disclosed by Canny "*A computational approach to edge detection*," IEEE Transactions on Pattern Analysis and Machine Intelligence 6, 679-698 (1986). Only pixels whose probability is either higher than a given threshold $\xi_u$ or which are connected to such pixels in space or time via some other pixels with probabilities no lower than $\xi_l$ are kept. $\xi_u = 0.005$, $\xi_l = 0.001$ is used for the results. Third, since the inpainting may have missed a few eyelashes, which may occur if the eyelashes are clustered, wrinkle probability maps from multiple views and filter wrinkle probabilities where the views do not agree are consolidated.

Therefore, the probable location of a wrinkle can be determined using the wrinkle probability map which is generated according to the exemplary method 700 described in FIG. 7.

5. Optical Flow

In order to track an eyelid over time, optical flow of the eyelid from one image frame to another image frame can be computed. Optical flow of the eyelid is a pattern of apparent motion of the eyelid between an observer and a scene. The frames which can be used to compute optical flow can be frames of images of the subject which can be acquired by a camera as described in FIGS. 3 and 4.

Figure 8:
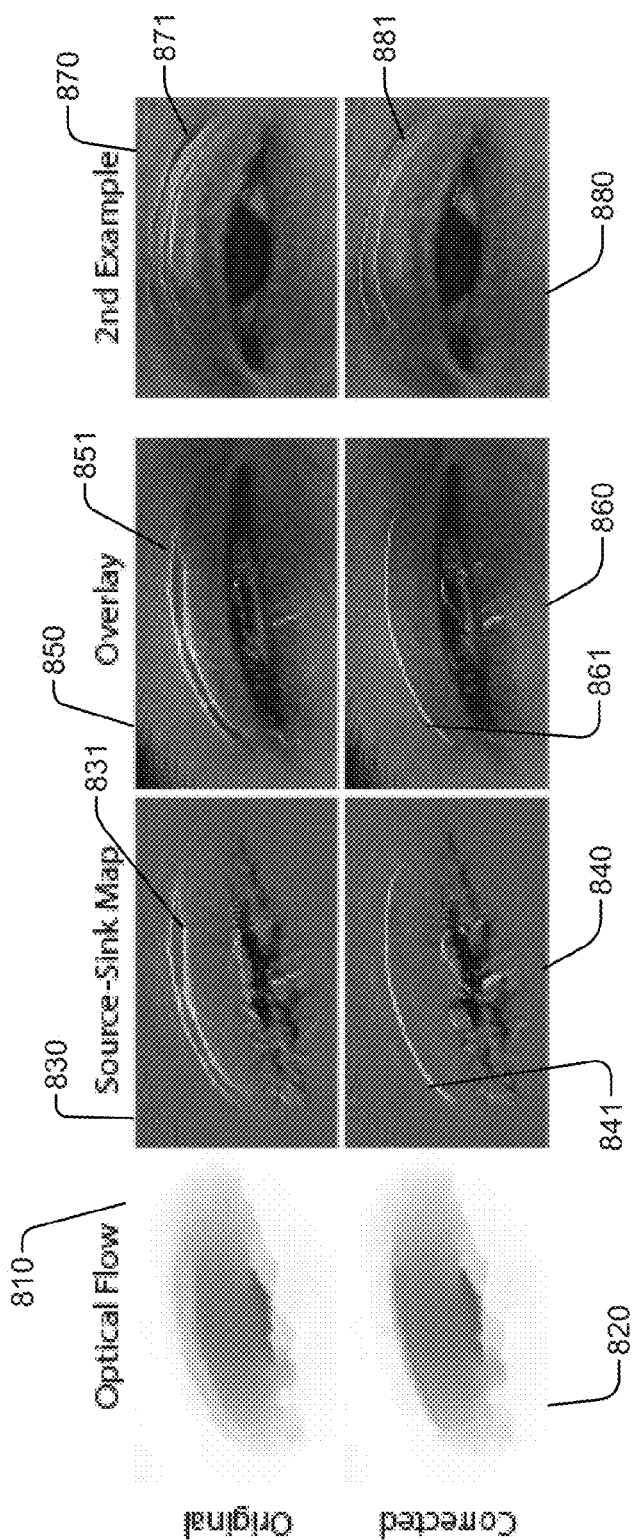
FIG. 8 illustrates optical flow of an eyelid, in accordance with an exemplary embodiment.

FIG. 8 illustrates optical flow of an eyelid, in accordance with an exemplary embodiment. Image 810 shows an original optical flow of an eyelid in a frame, image 830 shows a source-sink map of the eyelid, and image 850 shows an overlay of the wrinkle, identified based on the original optical flow shown in image 810, on the eyelid. Image 820 shows a corrected optical flow of an eyelid in a frame, image 840 shows a source-sink map of the corrected eyelid, and image 860 shows an overlay of the wrinkle, identified based on the corrected optical flow shown in image 820, on the eyelid.

In FIG. 8, the colors in the optical flow represent movement of pixels in an image. As shown in images 830 and 850, optical flow can perform poorly at a wrinkle location. As shown in images 830 and 850, wrinkling poses problems for optical flow since the appearance changes and parts become occluded.

The original optical flow 810 of a frame, is inaccurate around a wrinkle and compresses on both sides of the wrinkle as shown in the source-sink map image 830. A source-sink map (S) encodes the density of the optical flow and is computed by accumulating the inbound flow vectors for every pixel. Areas where the flow vectors diverge are considered a source and appear dark. Areas where the flow vectors converge are considered a sink and appear bright. For example, in image 830, areas that appear white are a sink and areas that appear black are a source.

The incorrect flow vectors become apparent as shown in the source-sink map in image 830. As shown in image 830, the flow 831 compresses on both sides of the wrinkle and not inside of the wrinkle, which would be the correct sink. This can occur because of the optical flow computation. The local shading changes at the wrinkle which therefore confuses the flow computation.

Correcting the optical flow, as shown in image 820, provides a desired behavior where the flow converges into the wrinkle 841 as shown in source-sink map 840. As shown in image 840, there is a clearer difference between a top and a bottom part of an eyelid since the optical flow 841 is flowing into a sharp crease.

Images 870 and 880 illustrate another example of images before and after optical flow correction. Image 870 illustrates the optical flow 871 of an eyelid with a double wrinkle prior to optical flow correction. Corrected image 880 illustrates the optical flow 881 of the eyelid shown in image 871 after optical flow has been corrected. As shown in FIG. 880, by correcting the optical flow, the flow converges into the wrinkle.

Figure 9:
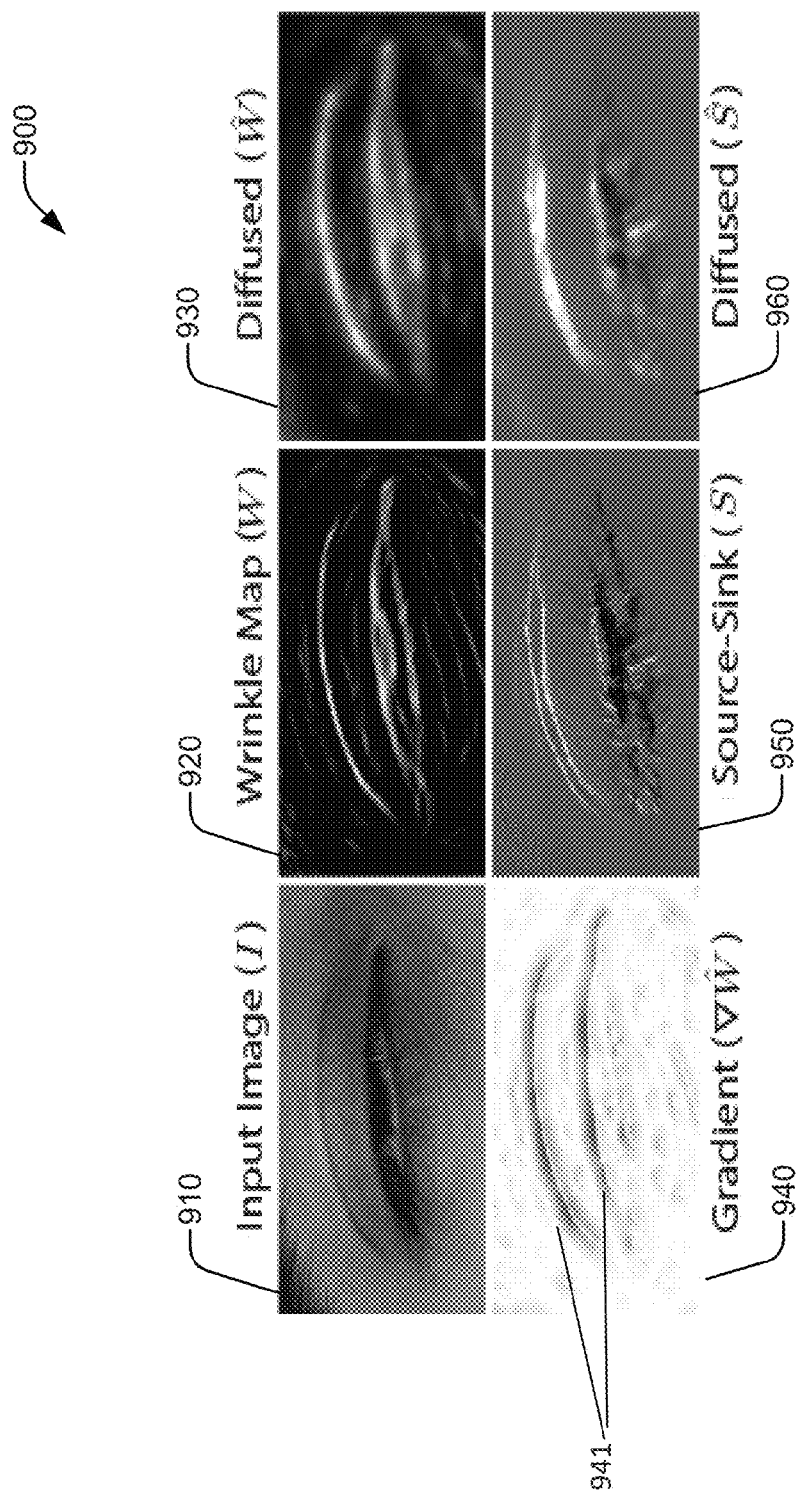
FIG. 9 illustrates a method of correcting optical flow, in accordance with an exemplary embodiment.
Figure 10:
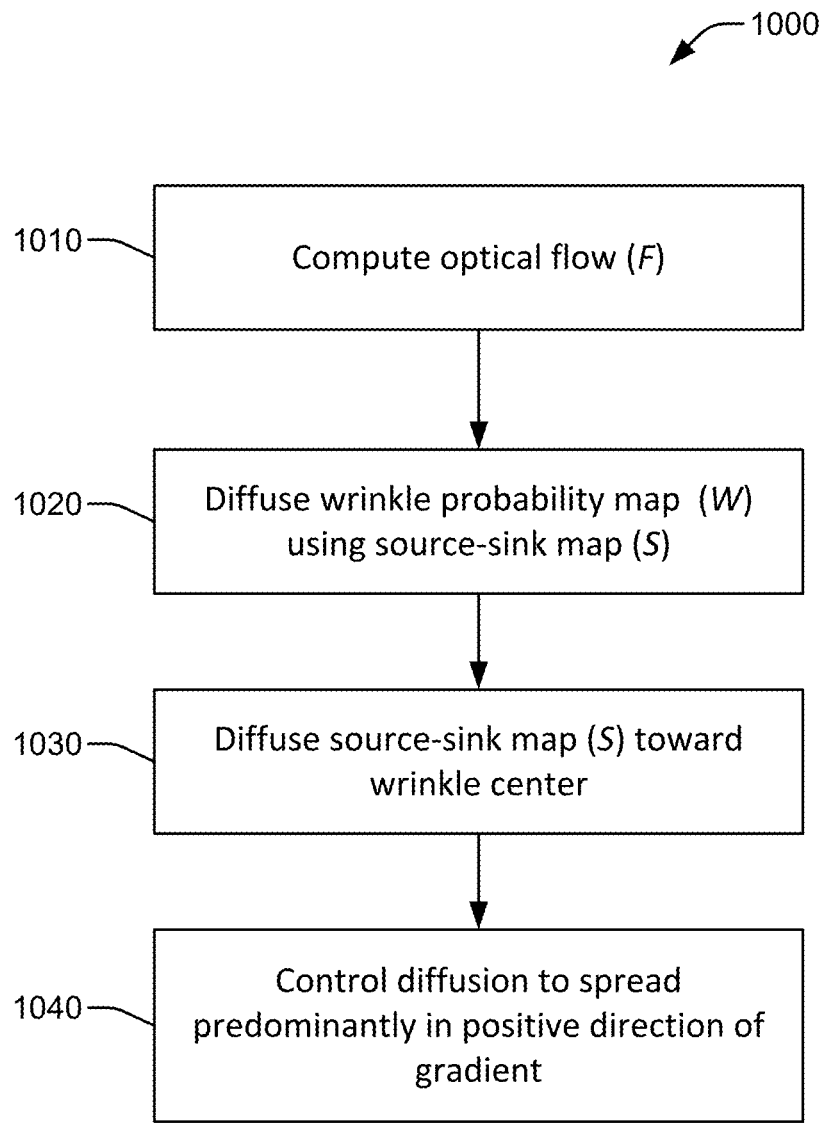
FIG. 10 illustrates a flowchart of a method for correcting optical flow, in accordance with an exemplary embodiment.

Therefore, a method according to an exemplary embodiment corrects the optical flow. FIG. 9 illustrates a method 900 of correcting optical flow, in accordance with an exemplary embodiment. FIG. 10 is a flowchart of a method 1000 for correcting optical flow, in accordance with an exemplary embodiment.

FIG. 9, illustrates an input image (I) 910 of an eye region of a subject, a wrinkle probability map (W) 920, a diffused ($\hat{W}$) image 930, a gradient ($\nabla\hat{W}$) image 940, a source-sink map (S) 950 and a diffused ($\hat{S}$) image 960.

Input image (I) 910 is a close-up of an image. Wrinkle probability map (W) 920 shows areas in white in which a wrinkle is highly probable or where there is a high probability of a wrinkle as determined by, for example, the wrinkle probability map generator 213. Contours between the eyeball and eyelids could appear as having a high probability of wrinkles however, wrinkles will not be formed there. Diffused ($\hat{W}$) image 930 is a diffused wrinkle probability map. For example, the wrinkle probability map (W) 920 can be diffused or blurred. By blurring out the possible wrinkle locations, gradients can be computed which can give an indication regarding what direction to move in the image in order to obtain a higher wrinkle probability. As shown in gradient ($\nabla\hat{W}$) image 940, the lines 941 indicate a probable wrinkle location. Source-sink map (S) 950 is similar to the source-sink map described with respect to images 831 and 840 of FIG. 8. Diffused ($\hat{S}$) image 960 is an image of the source-sink map (S) 950 that has been diffused or blurred.

FIG. 10 illustrates a method 1000 for correcting optical flow, in accordance with an exemplary embodiment. At step 1010 of FIG. 10, the optical flow (F) is computed from one frame to a next frame in order to track an eyelid over time. The method for computing the optical flow of the frames can be performed using a method as disclosed by Brox et al., "*High accuracy optical flow estimation based on a theory for warping*," ECCV. Springer, 25-36 (2004). The method of computing the optical flow of the frames can be performed on inpainted images. The inpainted images can be the images which are obtained by the method shown in FIG. 5.

At step 1020, the wrinkle probability map (W) 920 is diffused by using the source-sink map (S) 950. By using the source-sink map (S) 950 as a guide, the wrinkle probability map (W) 920 is diffused smoothly to spread out the probabilities as shown in diffused ($\hat{W}$) image 930. A wrinkle probability map (W) can be obtained using a method as described in FIG. 7. In the exemplary embodiment, the existing probability is not reduced, but spread out. Therefore, the wrinkle probability map (W) is iteratively updated using the following equation:

$$\hat{W}_{xy}^{k+1} = \max(\hat{W}_{xy}^k, N(\hat{W}^*)_{xy}) \quad \text{(Equation 1)}$$

where $\hat{W}^k$ denotes the diffused wrinkle probability map at the k-th iteration, $\hat{W}^0 = W$ and N is a Gaussian filter of size 7×7. An eye region, as shown in input image (I) of FIG. 9, is approximately 400 pixels wide. The number of iterations required is determined by the distance of the sink to the true wrinkle location. A same number of iterations, for example, 30 iterations, can be applied to all of the frames. This will lead to a smoothed map as shown in image 930 of FIG. 9. The gradient of this map ($\nabla\hat{W}$) as shown in image 940 of FIG. 9 indicates the direction towards the closet wrinkle and will be used to correct the optical flow.

At step 1030, the source-sink map (S) as shown in image 930 is diffused toward a wrinkle center. This will determine the area in which the flow needs to be corrected. A method of performing a variant of anisotropic diffusion as disclosed in Perona et al., "*Scale-space and edge detection using anisotropic diffusion*," IEEE Transactions on Pattern Analysis and Machine Intelligence, 12, 7 (July), 629-639 (1990), can be used to diffuse the source-sink map (S) as shown in image 930 toward a wrinkle center. Therefore, the following equation can be used:

$$\hat{S}^{k+1} = \hat{S}^k + \lambda\psi(c(\nabla\hat{W})\nabla\hat{S}^k) \quad \text{(Equation 2)}$$

where $\hat{S}^k$ denotes the diffused source-sink map at the k-th iteration and $\hat{S}^0 = S$. Instead of preventing smoothing along the gradient, at step 1040, the diffusion is controlled to spread predominately in the positive direction of the gradient.

As a diffusion coefficient c, the following is used:

$$c(\nabla\hat{W}) = \left| e^{-(\frac{\Delta\hat{W}}{n}+1)} \right|_{0,1} \quad \text{(Equation 3)}$$

where n (0.01) controls the sensitivity and $|\bullet|_{0,1}$ clamps to the range of [0,1] to warrant the maximum principle. The retaining function $\psi(x)$ attenuates the decay my multiplying x with a user given parameter (0,1) whenever x<0, thus spreading this information to a larger region. The timestep $\lambda$ was set to ⅛ and the diffusion is run for 60 iterations leading to the result shown in image 960 of FIG. 9. $\hat{S}$ is used to attenuate diffusion of the optical flow field outside of the wrinkle neighborhood by including $\hat{S}$ into the diffusion coefficient as:

$$c(\hat{S}, \nabla\hat{W}) = \left| \hat{S} e^{-(\frac{\Delta\hat{W}}{n}+1)} \right|_{0,1} \quad \text{(Equation 4)}$$

and then diffuse the optical flow field F using Equation 2. In order to prevent flow vectors from overshooting the wrinkle location, the flow vectors are only updated if the wrinkle probability gradients at the origin and destination of the flow vector point in the same direction. That is, that the flow remains on the same side of the wrinkle.

Therefore, in order to correct the optical flow maps, different variants of diffusion can be used. As shown in FIG. 9, a wrinkle probability map (W), as shown in image 920, is diffused isotropically with retention, as shown in image 930. The gradient ($\nabla\hat{W}$) of the diffused map, as shown in image 940, encodes the direction to the closet wrinkle and is used to diffuse the source-sink map (S), as shown in image 950. The source-sink map (5) is diffused anisotropically with retention, as shown in image 960. A corrected optical flow can consequently be created.

6. Eyelid Contours

Time-varying 2D eyelid contours can be used as a constraint for reconstructing an accurate eyelid deformation.

Figure 11:
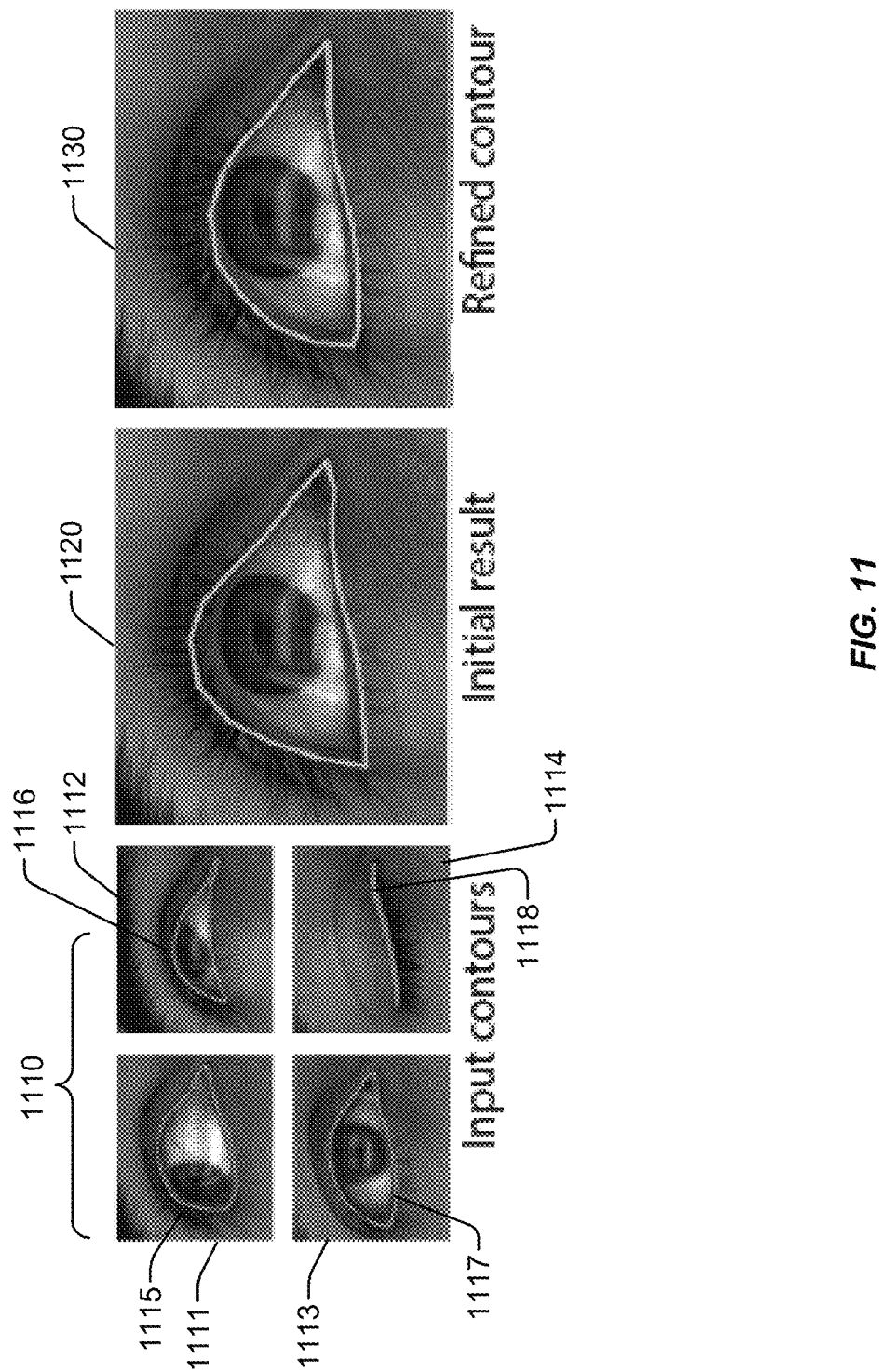
FIG. 11 illustrates a method of creating an eyelid contour, in accordance with an exemplary embodiment.
Figure 12:
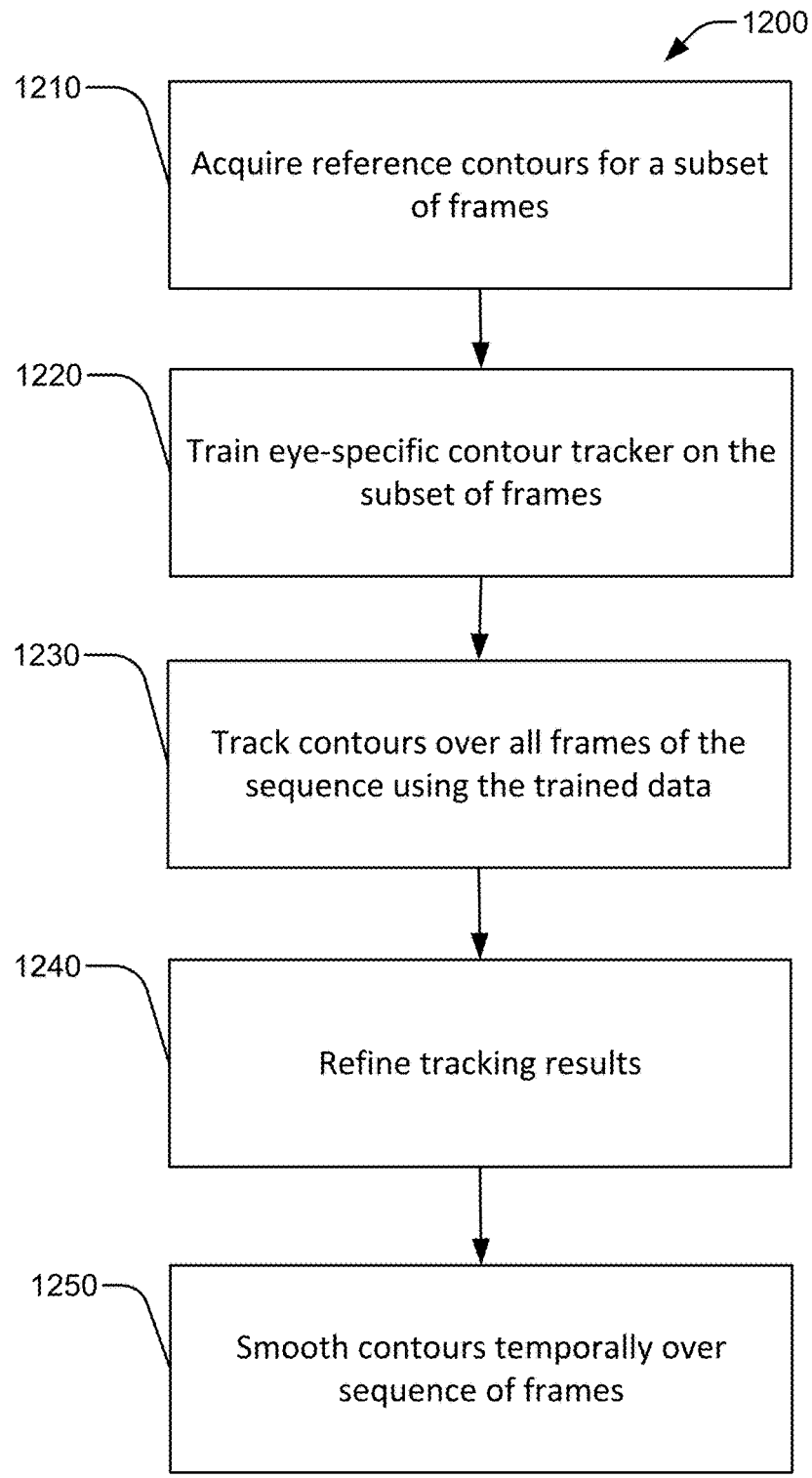
FIG. 12 illustrates a flowchart of a method of creating an eyelid contour, in accordance with an exemplary embodiment.

FIG. 11 illustrates a method of creating an eyelid contour, in accordance with an exemplary embodiment. FIG. 11 illustrates input contours 1110, an initial result image 1120, and a refined contour image 1130. FIG. 12 illustrates a flowchart of a method 1200 of creating an eyelid contour, in accordance with an exemplary embodiment.

At step 1210 of FIG. 12, reference contours for a subset of frames are acquired. A frame is one image in time. One frame for each eye can be computed. A frame can be based on an image of the subject which is obtained by the system described with respect to FIG. 3. There can be, for example, hundreds of frames which make up a subset or a sequence of frames. In creating the pre-computed contour curves for a given subject or actor, 20 to 30 frames are chosen that can exemplify a variation of contour shapes in the sequence of frames. In an exemplary embodiment, 20 to 30 frames can be used, however, this is merely exemplary and the number of frames used can vary depending on the amount of variation in the eyelids of the subject. As shown in images 1111, 1112, 1113 and 1114 of FIG. 11, in creating the input contours 1110, an eyelid contour is traced in each of the images 1111, 1112, 1113 and 1114 to create reference contours 1115, 1116, 1117 and 1118, respectively. The reference contours 1115, 1116, 1117 and 1118 can be manually created by a user, such as an artist.

Input contours 1110 can include a subset of reference contours 1115, 1116, 1117 and 1118 as shown in FIG. 11. Four reference contours are shown in FIG. 11, however, these are merely examples, and the exemplary embodiments are not limited to four reference contours.

Each of the reference contours 1115, 1116, 1117 and 1118 is represented by a set of landmarks placed equidistantly along the contour from an inner eye corner to an outer eye corner. Therefore, for each eye, two outer corners can be designated as two landmarks and the other landmarks are divided equidistant between the two outer corners. For example, twenty (20) landmarks can be placed on the contour. Although twenty landmarks can be used, this is merely exemplary and the number of landmarks can be modified as desired by the user.

From the reference contours acquired in step 1210, at step 1220, the eye-specific contour tracker is trained on the subset of frames. After training the eye-specific contour tracker on the subset of frames, one or more predicted contours can be obtained.

At step 1230, the predicted contours are tracked over all of the frames of the sequence using the trained data. The predicted contours are tracked in image space from a single front view. The predicted contours can be tracked by computing an initial contour shape estimate using a regression framework as described by, for example, Cao et al., "*Face alignment by explicit shape regression*," IEEE CVPR, 2887-2894 (2012). However, any similar system, such as active appearance trackers can be used.

For example, in order to track the predicted contours over the sequence, a contour tracker is applied on the frames which are taken from the same view. A tracking result from each frame is used to initialize tracking which will be performed in a next frame. The tracking results can produce an estimate of the contour shape and position as shown in initial result image 1120. However, the tracking result may not be sufficient to accurately constrain the eyelid reconstruction. That is, the initial result image 1120 may not be accurate enough for good localization. Therefore, the tracking result can be further refined.

At step 1240, the predicted tracking results can be refined. For each frame, the most similar reference frame is retrieved. The most similar reference frame is obtained by comparing a shape of the predicted contour to the reference contours. The retrieved reference frame is a reference frame that is most similar to the frame by comparing the shape of the predicted contour with the reference contours 1115, 1116, 1117 and 1118. For example, reference contour 1116 can be used for the eyelid shown in image 1120 since it has the most similar shape.

The contour position in the image space can be refined using optical flow. An optical flow can be computed between the reference image and the current image. The optical flow can be computed based on a method as described by Brox et al., "*High accuracy optical flow estimation based on a theory for warping*," ECCV. Springer, 25-36 (2004). Flow vectors are used to deform the reference contour into the current frame yielding subpixel-accurate registration to the reference frame, as shown in refined contour image 1130.

The sequential frames may be matched to different reference frames, that is frames having different reference contours, which could lead to temporal jitter since the reference contours can exhibit inaccuracies when they are hand drawn. Therefore, at step 1240, the contours can be smoothed temporally over the entire sequence of frames using optical flow which is computed between frames to produce an accurate and temporally smooth eyelid contour.

B. Eyelid Reconstruction

After the data for eyelid reconstruction has been prepared and generated, eyelid reconstruction can be performed. Eyelid reconstruction can include visible skin deformation and wrinkle reconstruction.

According to an exemplary embodiment, during eyelid reconstruction, an eyelid, such as an eyelid created during eyelid initialization as described with respect to FIG. 6, is evolved over time t. The eyelid is represented by a template mesh L, which consists of regularly sampled vertices $v_{i,j}$ along a horizontal direction j corresponding to the dominant main wrinkle orientation and the orthogonal vertical direction i, as described in FIG. 6.

Figure 13:
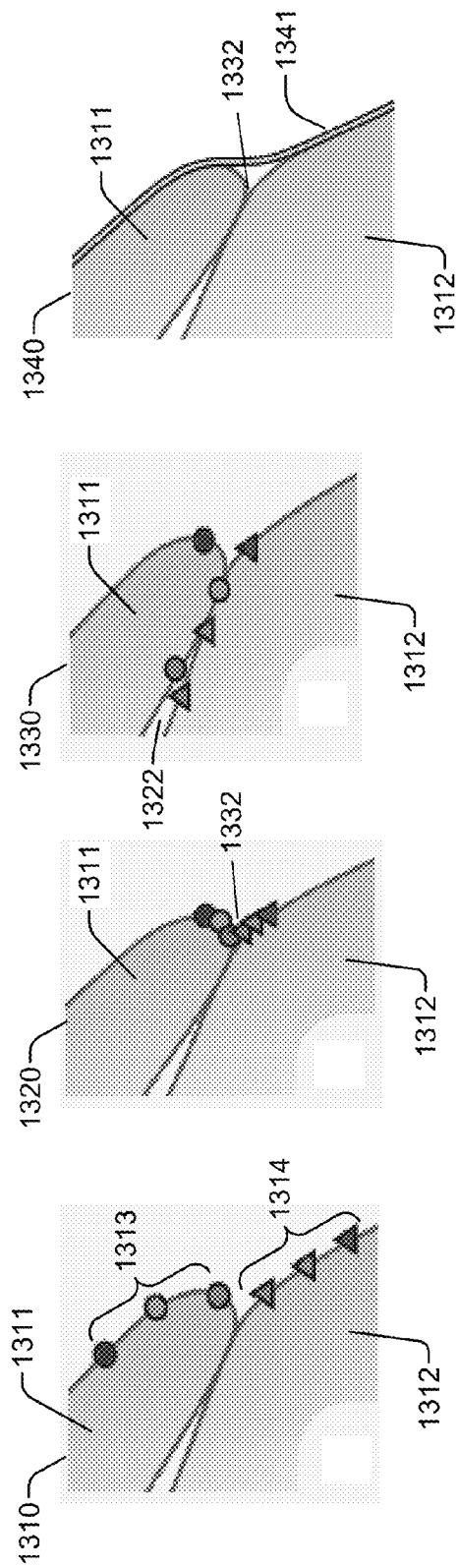
FIG. 13 illustrates vertices at a wrinkle location, in accordance with an exemplary embodiment.

The eyelid reconstruction according to an exemplary embodiment correctly positions vertices on an eyelid during wrinkling. Therefore, a valid vertex can be created that can be used for eyelid reconstruction. FIG. 13 illustrates vertices at a wrinkle location, in accordance with an exemplary embodiment. FIG. 13 illustrates a side view of an upper eyelid 1311 and a lower eyelid 1312. The upper eyelid 1311 includes circles 1313 which represent vertices on the upper eyelid 1311. The lower eyelid 1312 includes triangles 1314 which represent vertices on the lower eyelid 1312.

During wrinkling, the vertices 1313 and 1314 can compress from their initial position as shown in image 1310 into a wrinkle location 1332 as shown in image 1320 since they become occluded during wrinkling.

Image 1340 illustrates an estimated depth 1341 which is inaccurate at the wrinkle location 1332 since a multi-view stereo method cannot resolve small scale details given an input image. As shown in image 1320 of FIG. 13, the vertices 1313 and 1314 are aggregated at a wrinkle location 1332. The problem is further aggravated since a multi-view stereo method cannot accurately reconstruct small scale details as shown in image 1340. Therefore, the geometry in the wrinkle area may not be reliable. Therefore, according to an exemplary embodiment, an anatomically plausible wrinkle shape is created, and the vertices 1313 and 1314 are moved into the wrinkle valley 1322 in a physically meaningful manner as shown in image 1330 of FIG. 13.

In accordance with an exemplary embodiment, as shown in image 1330, during wrinkling a deformation model moves the vertices 1313 and 1314 from their initial position, as shown in image 1310, into the wrinkle 1332 in an anatomically plausible way.

Figure 14:
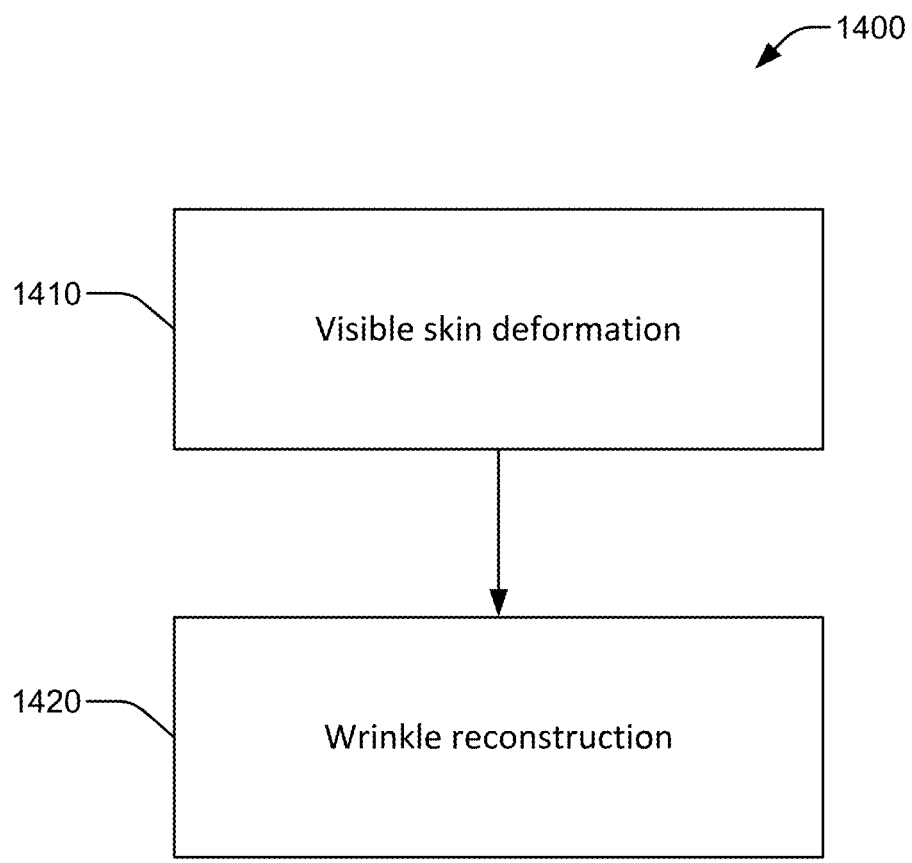
FIG. 14 illustrates a flowchart of a method for eyelid reconstruction, in accordance with an exemplary embodiment.

FIG. 14 illustrates a flowchart of a method 1400 for eyelid reconstruction, in accordance with an exemplary embodiment. As shown in FIG. 14, visible skin deformation is performed at step 1410 followed by wrinkle reconstruction at step 1420.

1. Visible Skin Deformation

Deformation can include the evolution of the eyelid with respect to time from one frame to another frame or changing the eyelid shape over time. A template mesh, such as that described in FIG. 6, can be used with the evolution of time. Points on the eyelid are moved to match the appearance of the eyelid at every point in time. The skin of the eyelid can be deformed based on optical flow and tracked contour data since optical flow and tracked contour data can provide a desired behavior in an area that is visible both in a current and previous frame and areas undergoing moderate deformation. The deformation model can serve as a prior that enables reconstruction of an eyelid even under strong self-occlusions caused by rolling and folding skin as the eye opens and closes.

At step 1410, visible skin deformation can be performed. The deformation model is driven by the visible area of the skin. The eyelid is deformed using optical flow while respecting tracked boundary conditions from the surrounding face. Tracked boundaries are boundaries or constraints that can be followed when reconstructing the eyelid. Tracked boundaries can include, for example, eyelid contours and a user designated boundary region. The extreme deformation occurring around the wrinkle areas are handled during wrinkle reconstruction at step 1420.

Figure 15:
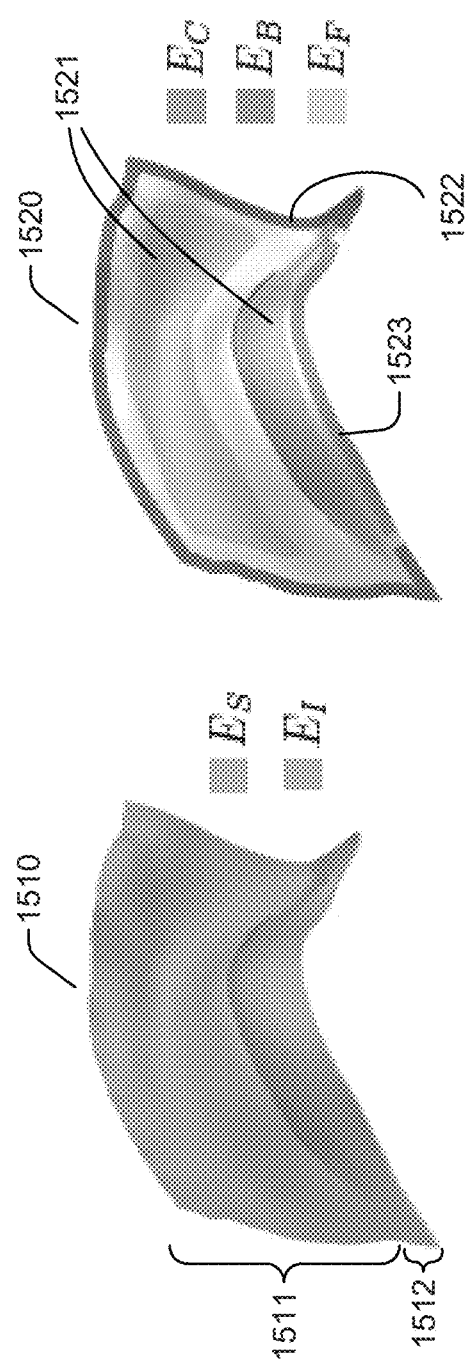
FIG. 15 illustrates a spatial distribution of energies on a mesh, in accordance with an exemplary embodiment.

FIG. 15 illustrates a spatial distribution of energies on a mesh, in accordance with an exemplary embodiment. Image 1510 of FIG. 15 shows regulation of visible skin deformation by two thin-shell energies $E_S$ and $E_I$. Region 1511 illustrates an $E_S$ thin-shell energy and region 1512 illustrates an $E_I$ thin shell energy. Thin-shell energy is $E_S$ regulates most of the eyelid for temporal smoothness. Thin-shell energy $E_I$ regulates the eye-eyelid interface for rigidity relative to the rest pose. Image 1520 illustrates the mesh regions contributing to each data term. A region 1521 represents data term $E_F$, a region 1522 represents data term $E_B$, and a region 1523 represents data term $E_C$. Tracked contours contribute to $E_C$. The interface with the face mesh contributes to $E_B$. The visible interior region contributes to the flow term $E_F$.

The eye-eyelid interface, which is the interface between the eye and an eyelid, transforms mostly rigidly as it fits tightly around the eye shape while sliding over it. Consequently, this area preserves its shape based on the underlying eye and mostly rotates when the lid opens, unlike the rest of the eyelid which undergoes strong wrinkling. As shown in FIG. 15, two linear thin-shell energies ($E_S$, $E_I$) are combined to deform the eyelid guided by three data terms ($E_C$, $E_B$, $E_F$). Data term $E_C$ is contour data, data term $E_B$ is boundary data, such as the outer edge boundaries, and data term $E_F$ is flow data, such as optical flow. Therefore, for the visible part of the eyelid, the optical flow was computed in the image to indicate where points should move. The data terms guide the change in shape of the eyelid. Although three data terms are disclosed, this is merely an example and more than three or less than three data terms can be used. The two linear thin-shell energies are described in Botsch et. al "*On linear variational surface deformation methods*," IEEE Transactions on Visualization and Computer graphics, 14, 1, 213-230 (2008).

The first energy $E_S$ regularizes the deformation based on the shape of the lid at the previous frame $L^{t-1}$ and is given as:

$$E_S = \sum_V \|\Delta_{L^{t-1}}(v_{i,j}^t - v_{i,j}^{t-1})\|^2 \quad \text{(Equation 5)}$$

where $\Delta L^{t-1}$ is the discrete Laplace-Beltrami operator for the eye-lid mesh $L^{t-1}$ and V denotes all vertices of the mesh.

The second energy $E_I$ reflects the deformation driven by the rigidly transforming region at the eye-eyelid interface $V^I$. It seeks to deform this region to match the rest pose, up to a global rotation $R^t$:

$$E_I = \sum_{V^I} \|\Delta_{L^0}(T^t v_{i,j}^t - v_{i,j}^0)\|^2 \quad \text{(Equation 6)}$$

where $\Delta_{L^0}$ is the discrete Laplace-Beltrami operator, this time computed from rest pose. The two Laplace-Beltrami operators only differ in the cotangent weights, which is required to account for skin compression while the lid opens. Image 1510 of FIG. 15 depicts the regions regulated by these energies.

The eye-eyelid interface itself does not transform purely rigidly, but undergoes some deformation due to the shape of the underlying eye. This is accounted for by incorporating the contours, which can be computed as described with respect to FIGS. 11 and 12, as an energy term:

$$E_C = \sum_{V^C} \|P(v_{i,j}^t) \cdot C^t\|_\ell^2 \quad \text{(Equation 7)}$$

where $\|\bullet,\bullet\|_l$ denotes the point-line distance in image space computed by projecting $v_{i,j}^t$ into the camera image using a camera projection matrix P. the contour imposes constraints on the vertices $V^C$ at the eye-eyelid interface of the eyelid mesh L. The remaining boundary should deform such that it is compatible with the face mesh M to alleviate integration of the eyelid mesh L with the face mesh M. for the vertices $V^B$ in the outer two rings at these boundaries, the motions is constrained to be similar to the motion of the corresponding points $C^B$ on the face mesh. A correspondence $c_{i,j}^B \in C^B$ is computed as the closest point in rest pose to the eyelid vertex $v_{i,j}^0 \in V^B$. Encoding the correspondence in barycentric coordinates of the adjacent triangle allows it to propagate in time consistently with the face mesh. The boundary energy term is then:

$$E_B = \sum_{V^B} \|v_{i,j}^t - c_{i,j}^{B,t}\|^2 \quad \text{(Equation 8)}$$

The valid vertices in the interior of the eyelid $v_{i,j}^t \in V^{F,t}$ at time t are constrained by optical flow. The positional constraints are computed $c_{i,j}^{F,t} \in C^{F,t}$ for these vertices by projecting them into the main camera's image plane and advecting them using the optical flow F and elevating them back into 3D using the depth maps D. A vertex is considered to be valid if it is visible from the main camera, does not exhibit a high enough wrinkle probability and is sufficiently far from the boundary. A valid vertex is a vertex that will be used for the flow term. As shown in image 1520 of FIG. 15, the region 1521 corresponding to data term $E_F$, which is optical flow, is the part of the eyelid mesh which is not too close to the boundary, not too close to a wrinkle and is a region that can be visibly tracked. In the exemplary embodiment, a 5-ring margin from the border can be used. The flow energy term:

$$E_F = \sum_{V^{F,t}} \gamma_{i,j} \|v_{i,j}^t - c_{i,j}^{F,t}\|^2 \quad \text{(Equation 9)}$$

where $\gamma_{i,j}$ is a confident weight indicating how much the constraint can be trusted. The confidence is provided by the multi-view geometry reconstructions method and is a measure of how similar the neighborhood of this vertex looks in the different views. This helps overcome outliers caused by, for example, occluding eyelashes. The vertex set $V^{F,t}$ associated with $E_F$ may change over time. The vertex sets associated with all other energy terms remain constant throughout the sequence. Image 1520 of FIG. 15 illustrates the mesh regions which contribute to each data term.

Combining the individual terms together yields the total energy:

$$E=\lambda_F E_F+\lambda_B E_B+\lambda_C E_C+E_I+E_S \qquad \text{(Equation 10)}$$

where $\lambda_{F,B,C}$ are user parameters. In an exemplary embodiment, was fixed to $\lambda_F=\lambda_B=30$ and $\lambda_C=300$.

The rotation $R^t$ used in $E_I$ (equation 6) is unknown and can therefore be estimated. In an exemplary embodiment, estimation of deformation and rotation are interleaved and are iterated several times (for example, three times), starting with estimating the deformation.

2. Wrinkle Reconstruction

After deforming the visible parts of the eyelid, the hidden and newly occluded areas are processed. For these areas, optical flow computation may not be possible and the optical flow correction may compress the problematic vertices into the wrinkle area. Therefore, although the optical flow correction described in FIG. 8 improves the reliability in regions visible in both frames, it is unable to guide the deformation of the occluded mesh regions. For newly occluded regions, vertices will be compressed at the wrinkle location as shown in image 1320. Therefore, during wrinkle reconstruction, wrinkle regions can be identified and a dedicated wrinkle model that is parameterized with a small set of distinctive feature points can be used. Feature points of the wrinkle can be efficiently estimated from acquired data, which allows for plausible reconstruction of an eyelid even in regions with extreme skin deformations.

Figure 16:
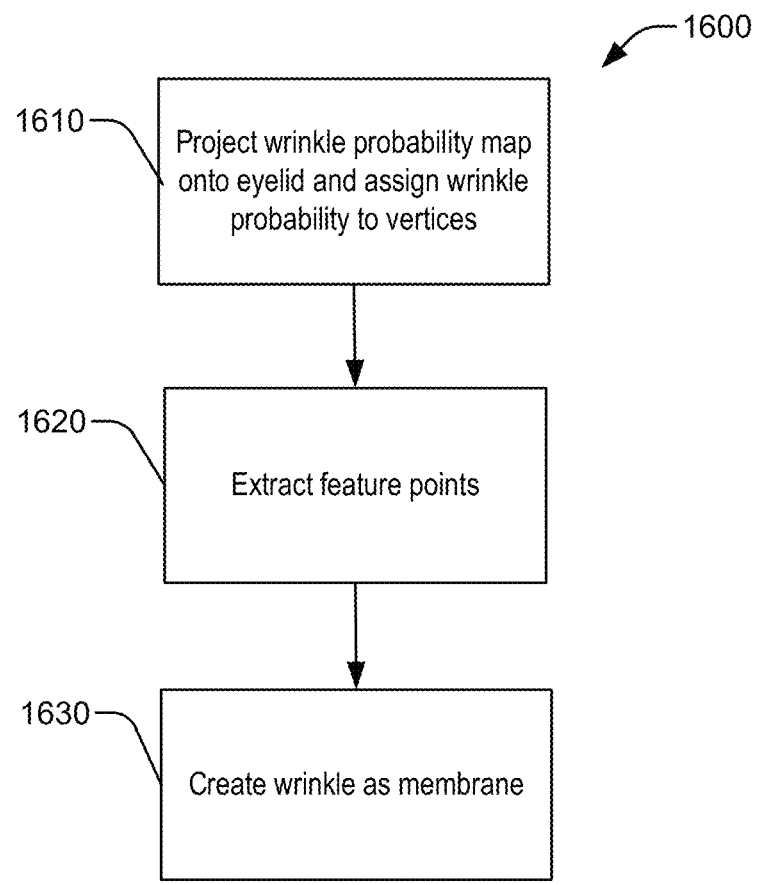
FIG. 16 illustrates a flowchart of a method of reconstructing a wrinkle, in accordance with an exemplary embodiment.

FIG. 16 illustrates a flowchart of a method 1600 of reconstructing a wrinkle, in accordance with an exemplary embodiment.

As shown in FIG. 16, at step 1610 a wrinkle probability map $W^t$ is projected onto the eyelid $L^t$ and a wrinkle probability $w_{i,j}^t$ is assigned to every vertex. The eyelid mesh has been designed such that distinctive wrinkle feature points, from which a hidden part of the wrinkle can be constructed, can be efficiently identified.

Figure 17:
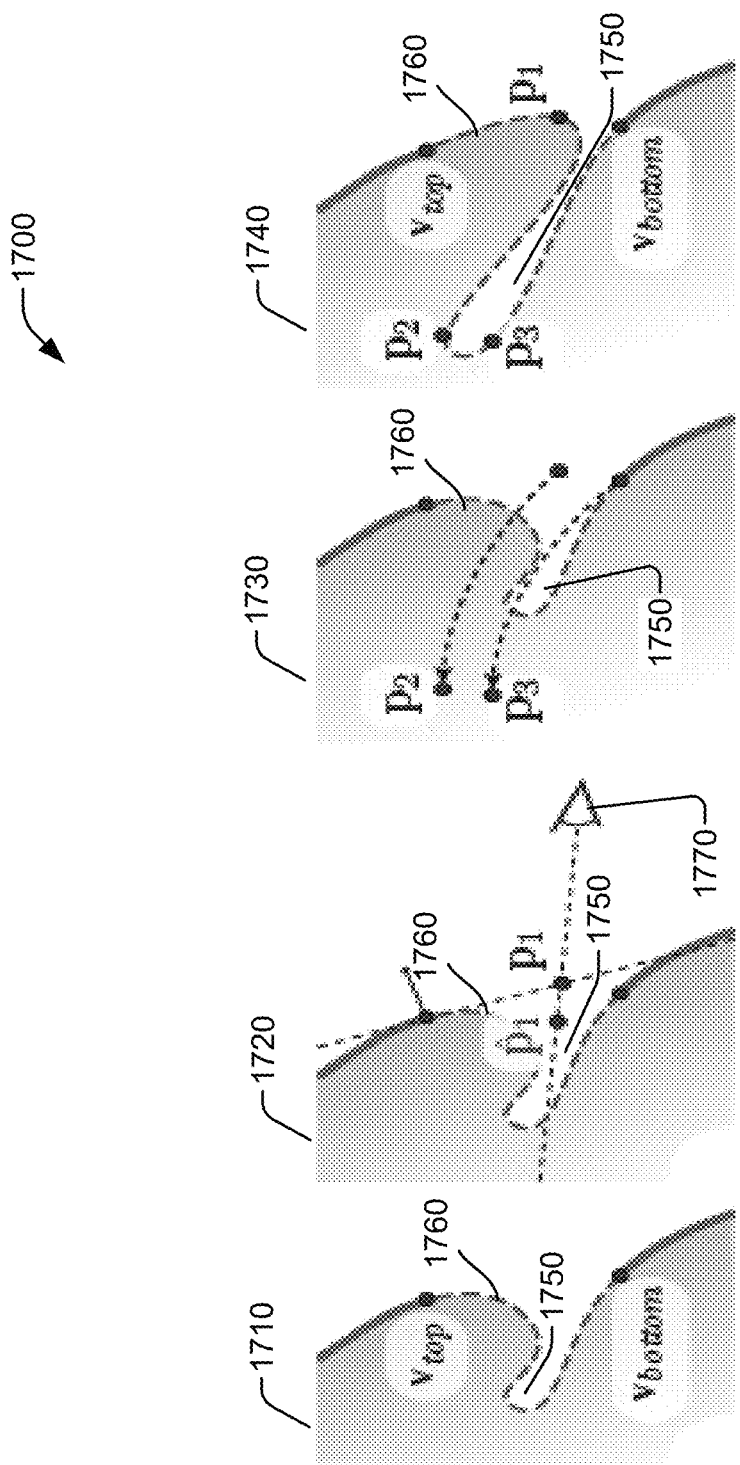
FIG. 17 illustrates a method of extracting feature points and creating a membrane, in accordance with an exemplary embodiment.

At step 1620, feature points are extracted. FIG. 17 illustrates a method 1700 of extracting feature points and creating a membrane, in accordance with an exemplary embodiment. Image 1710 illustrates a top vertex $v_{top}$ and a bottom vertex $v_{bottom}$ which bound a wrinkle area 1760. Image 1720 illustrates a front buckle $p_1$ computed by projecting a weighted average $\hat{p}_1$ of all visible vertices in the wrinkle area 1760 along the ray to the main camera 1770 onto the extension from $v_{top}$. Image 1730 illustrates two back-buckle points $p_{2,3}$ which are computed by rotating $p_1$ and the bottom vertex $v_{bottom}$ 1712 around an eye center. An eye-center is shown at, for example, image 630 of FIG. 6. The eye center can be located at the intersection of the x, y and z axis in the center of the eye. Therefore, regions that are going to buckle or wrinkle inwards are identified.

Image 1740 illustrates the wrinkle area 1760 constructed as a membrane from feature points allowing vertices in the wrinkle area 1760 to relax into the wrinkle 1750. The wrinkle area 1760 is constructed as a membrane such that the skin will not stretch. The skin will form as directed and will be as smooth as possible while, for example, folding and wrinkling.

When skin goes into the sink as shown with the optical flow in, for example, FIG. 7, the skin is deformed. As shown in image 1710, a buckle region or a region where the sink will wrinkle inward is identified. This region is marked by $v_{top}$ and $V_{bottom}$. This region can then be identified as a wrinkle area. A deformation model can be applied on the region to create a shape that looks like a wrinkle or to create a prior.

As shown in images 1720, 1730 and 1740, there are three points identified as $p_1$, $p_2$, and $p_3$. $p_1$ can be a point where the wrinkle starts folding inwards. $p_2$ can be a point where the wrinkle stops folding inwards and starts coming back. $p_3$ can be a point which is the end of the U-turn as shown in image 1740 and the region would start being straight until it approaches a region where the wrinkle can be tracked again or where the wrinkle is again visible.

In order to extract the feature points, as shown in FIG. 17, a wrinkle cross-section is traversed from top to bottom in order to sequentially provide the feature points of the top of wrinkle ($v_{top}$), the front-buckle ($p_1$), the back-buckle top ($p_2$), the back-buckle bottom ($p_3$) and the bottom of wrinkle ($v_{bottom}$). $v_{top}$ and $vv_{bottom}$ correspond to actual vertices of the mesh and $p_1$, $p_2$, and $p_3$ are points in space.

The feature point top of wrinkle ($v_{top}$) is a first vertex with a wrinkle probability $w_{i,j}^t > \xi$ when traversing the vertices of a column j from top to bottom. $\xi=0.1$ has been set for the results.

The feature point bottom of wrinkle ($v_{bottom}$) is a last vertex with a wrinkle probability $w_{i,j}^t > \xi$. The vertices between $v_{top}$ and $v_{bottom}$ denote the wrinkle area as shown in image 1710 of FIG. 17.

The feature point front-buckle ($p_1$) is computed by projecting the weighted average $\hat{p}_1$ of all visible vertex positions in the wrinkle segment onto the extended plane from $v_{top}$ as shown in image 1720 of FIG. 17. The weighted average is computed as $\hat{p}_1 = \Sigma w_{i,j}^t v_{i,j}^t / \Sigma w_{i,j}^t$ over all vertices in the wrinkle segment, where $w_{i,j}^t$ is the wrinkle probability associated with $v_{i,j}^t$.

A wrinkle folds inwards on an orbit around the eye. Therefore, the feature point back-buckle top ($p_2$) is computed by rotating front-buckle $p_1$ inwards around the eye center by half the geodesic distance from $v_{bottom}$ to the vertex closest to front-buckle $p_1$ computed in the rest pose, as shown in image 1730 of FIG. 17. The compression relative to the rest pose is accounted for due to the formation of micro-wrinkles by adjusting the rest length according to the compression in the neighboring visible skin. The feature point back-buckle bottom ($p_3$) is computed analogously to back-buckle top $p_2$ by rotating $v_{bottom}$ instead of front-buckle $p_1$.

At step 1630, the wrinkle is created as a membrane, as shown in image 1740 of FIG. 17. The membrane smoothly transitions into the visible part of the lid defined by the two vertices $v_{top}$ and $v_{bottom}$. The membrane closely approximates the three inner feature points (front-buckle $p_1$, back-buckle top $p_2$, back-buckle bottom $p_3$).

In order to resolve the compression problem as shown in image 1320 of FIG. 13, vertices are allowed to move freely on the membrane surface, in order to relax and slide into the wrinkle. This is performed by alternating between two stages in order to obtain a smooth surface that does not have corners or sharp ridges around very high fold curvatures. Therefore, an iterative process is performed. During these stages, the feature points are pushed to a desired location.

At a first stage, the vertices are relaxed in the wrinkle area 1760 by applying one iteration of Laplacian smoothing, which optimizes the surface to reduce stretching. This moves vertices into the wrinkle 1750, but also potentially pulls them away from the intended wrinkle shape.

In the second stage, the nearest vertex on the membrane is located for every feature point and their positions are constrained to the feature points while again solving for the Laplacian smoothing. The second stage pulls the surface back towards the desired shape.

For both the first stage and the second stage, Neumann boundary conditions are used at the border of the wrinkle area to ensure a smooth transition into the visible part of the eyelid. The first and second stages can be repeated, for example, six times, after which the vertices will have relaxed inside the wrinkle. In the exemplary embodiments, the first and second stages are each repeated six times, however, this is merely an example and the stages can be repeated as desired by the user.

Figure 18:
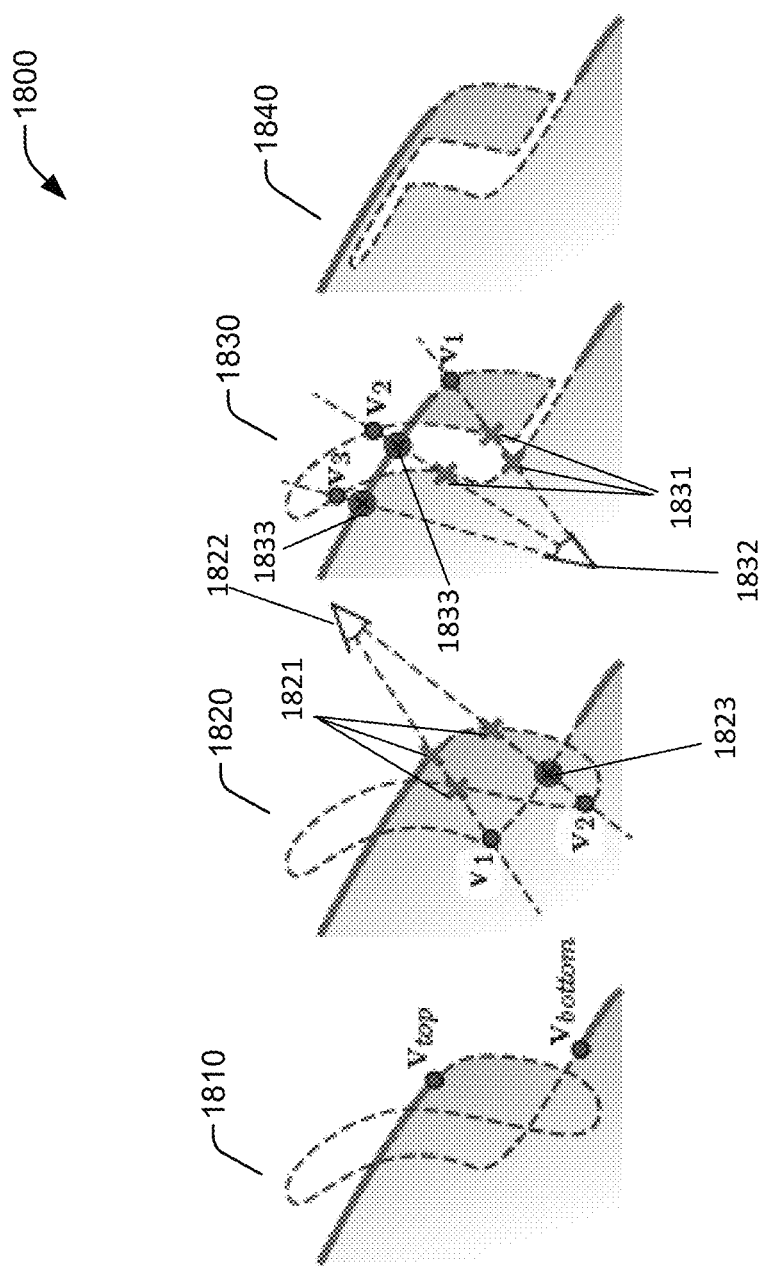
FIG. 18 illustrates a method of resolving self-intersections, in accordance with an exemplary embodiment.
Figure 19:
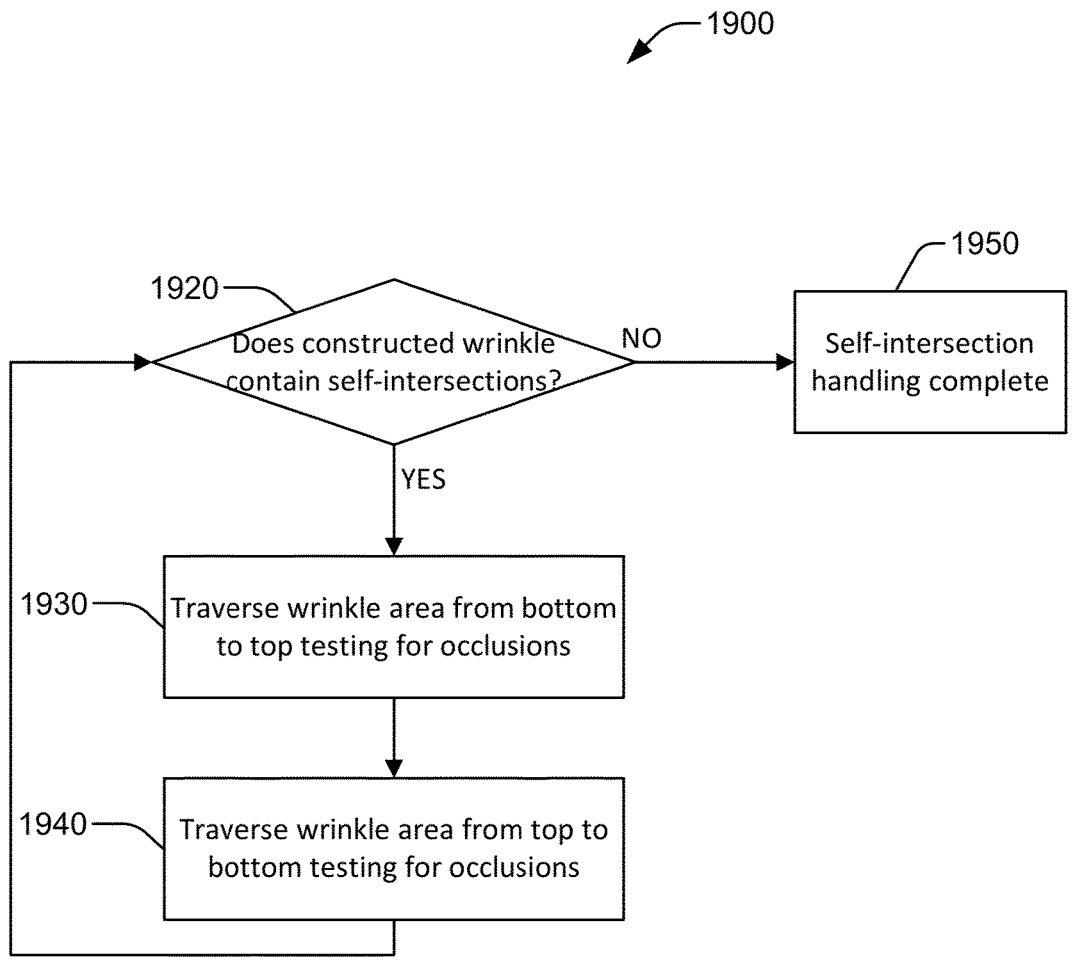
FIG. 19 illustrates a flowchart of a method for resolving self-intersections, in accordance with an exemplary embodiment.

After reconstructing a wrinkle, self-intersections may occur. That is, the formed wrinkle might protrude out from the visible part of the eyelid, or the smoothing might cause the wrinkle to intersect with itself. FIG. 18 illustrates a method 1800 of resolving self-intersections, in accordance with an exemplary embodiment. FIG. 19 illustrates a flowchart of a method 1900 for resolving self-intersections, in accordance with an exemplary embodiment.

In image 1810, $v_{top}$ and $v_{bottom}$ specify the outermost vertices or points on the eyelid of the wrinkle. Everything between $v_{top}$ and $v_{bottom}$ is considered to be the wrinkle and should fold nicely inwards. However, as shown in image 1810, the wrinkle may not fold nicely inwards and may contain self-intersections. Therefore, an exemplary embodiment creates a wrinkle which folds nicely inward by resolving self-intersections. Specifically, any visually distracting articles can be prevented and self-intersections that are visible externally to a user can be resolved.

At step 1920 of FIG. 19, it is determined whether there are self-intersections in the reconstructed eyelid. If there are no self-intersections, then self-intersection handling is completed at step 1950. If there are self-intersections, then the self-intersections can be resolved. Self-intersections are resolved leveraging the fact that the upper part of the eyelid folds over the lower eyelid.

The wrinkles form in such a way that skin farther away folds over skin closer to the eye. In terms of the eyelid model, this means that vertices further down a cross-section would not occlude vertices which are higher up. Therefore, an algorithm according to an exemplary embodiment sequentially traverses the vertices in the wrinkle area from $v_{bottom}$ to $v_{top}$, where the vertex indices decrease from bottom to top (bottom>i>top). For every vertex $v_i$, the method tests if $v_i$ is occluded by a lower part of the eyelid (i.e. a triangle that contains at least one vertex $v_{k,j}$ with k>i). If the vertex is occluded, it is moved in front of the occluding triangle. Visibility is determined from the point of view of, for example, a main camera or projection point. Therefore, the wrinkle area is traversed from bottom to top and vice versa in order to test for occlusions.

If a reconstructed wrinkle contains self-intersections, at step 1930, a wrinkle area is traversed from $v_{bottom}$ to $v_{top}$ in order to test for occlusions by lower parts as shown in image 1820. For every point on the eyelid that is located, it is determined whether the point is occluded. For example, for every vertex $v_i$ it is determined whether the point is occluded.

In image 1820 of FIG. 18, the method according to an exemplary embodiment, may not report a self-intersection for $v_1$ since it is only occluded by higher up parts. However, the method will correctly identify and correct $v_2$, which is occluded.

Points 1821 are not occluded because there is nothing between points 1821 and a projection point 1822. Projection points 1822 and 1832 represent rays which are projected from particular points. Projection points 1822 and 1832 are similar to having a camera or an eye looking and having the rays projected onto that point. Projection points 1822 and 1832 are a point of reference from which rays are projected. If a point has been tested and it is not occluded then it can be removed.

Point $v_2$ is read when it looks toward the projection point 1822. It is determined that there is an occlusion 1823. Therefore, vertex $v_2$ is moved in front of the occluding surface or moved towards the projection point 1822.

At step 1940, the procedure is reversed from $v_{top}$ to $v_{bottom}$ testing for occlusions. That is, the reconstructed wrinkle is traversed from the top to the bottom to test for occlusions as shown in image 1830. As shown in image 1830, it is determined that vertices $v_2$ and $v_3$ are occluded by occlusions 1833. The vertices $v_2$ and $v_3$ can be moved in front of the occluding surface 1833 or moved towards the projection point 1832.

Steps 1930 and 1940 can be repeated until all self-intersections are resolved. This can occur in for example, three iterations. Alternating these steps can produce an intersection free wrinkle as shown in image 1840. The resulting wrinkle is now behind the visible surface as shown in image 1840.

3. Integration

The tracked eyelid can then integrated with the full face. The full face can be obtained by using a method such as that described Beeler et al., "*High-Quality passive facial performance capture using anchor frames*," ACM Trans. Graphics (Proc. SIGGRAPH) 30, 75:1-75:10 (2011). The method of Beeler discloses using anchor frames which state that during a facial performance certain expressions will re-occur and therefore a reference frame is selected that is similar enough to the anchor frame in order to track the reference frame directly to the anchor frame.

Therefore, in an exemplary embodiment, tracking from closed eyelids is performed. A frame with a neutral expressions and closed eyelids is picked as a reference frame. The eyelid mesh is constructed from this frame to facilitate the integration of the eyelid mesh with the face mesh. The eyelid is naturally aligned with the face mesh and a dense correspondence can be established between the eyelid and the face mesh. The eyelid is then used to drive the deformation of the face mesh in this area. Since the boundary of the eyelid deforms in a compatible manner to the face mesh as described in FIG. 15, the integration is seamless. That is, the boundary region which connects the eyelid region to the face is deformed so that there is a smooth transition between the eyelid region and the face.

Further, since there can be eyelid wrinkles at the micro- and mesoscopic scales during deformation, mesoscopic optimization and temporal smoothing can be applied to produce temporally consistent high frequency details seamlessly across the full face including the eyelids.

II. Example Results

Eyelids are extremely unique and can produce different wrinkles. This variance is not only visible from person to person, but the shape and temporal deformation of the eyelids also differ substantially between the left and right eye of the same person. FIGS. 20, 21, 22, 23, 24, and 25 are examples of reconstructed eyelids, according to the exemplary embodiments.

Figure 20:
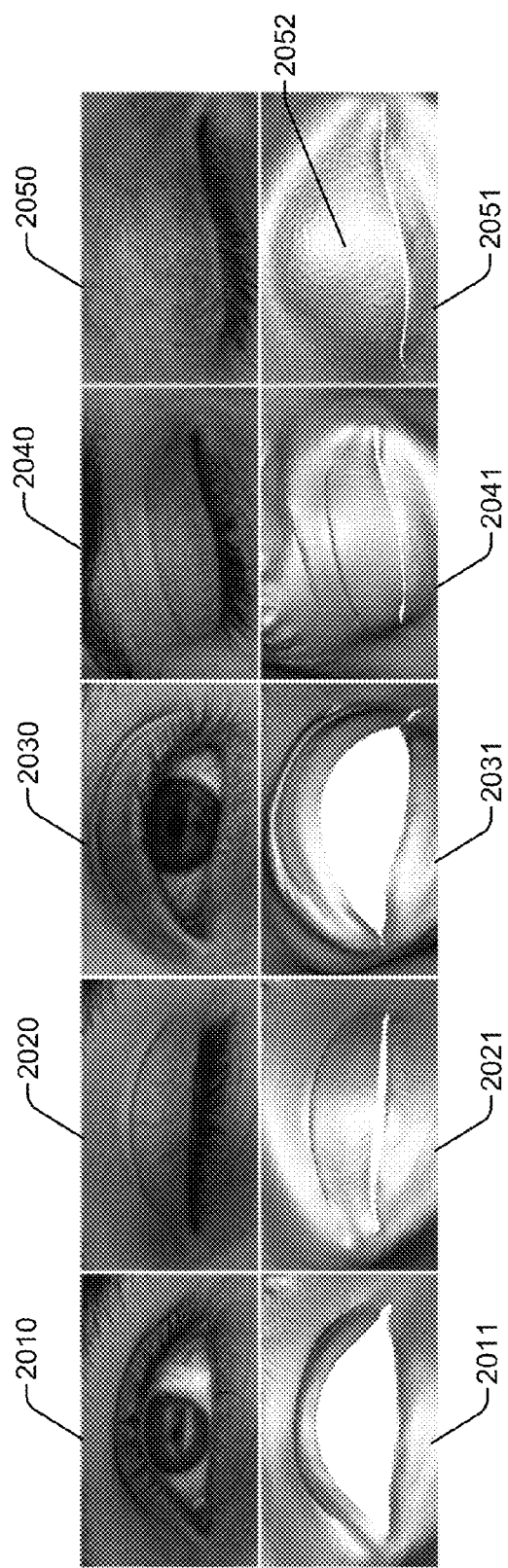
FIGS. 20, 21, 22, 23, 24, and 25 are examples of reconstructed eyelids, in accordance with the exemplary embodiments.

As shown in FIG. 20, different kinds of eyelids having different levels of complexity can be reconstructed, according to the exemplary embodiments.

Images 2010, 2020, 2030, 2040 and 2050 are images of an eye region which are captured by a camera. Images 2011, 2021, 2031, 2041 and 2051 are images of reconstructed eyelids based on images 2010, 2020, 2030, 2040 and 2050, respectively. Image 2011 is a reconstructed image of an eyelid which has thick wrinkles. Image 2021 is a reconstructed image of an eyelid which has thin wrinkles. Image 2031 is a reconstructed image of an eyelid which has double wrinkles close together. Image 2041 is a reconstructed image of an eyelid which has multiple distant wrinkles. Image 2051 is a reconstructed image of an eyelid which shows that when an eye closes, the wrinkles disappear completely. Further, there is a subtle bulge region 2052 on the lid caused by the cornea.

As shown in images 2010-2050 and 2011-2051, the shape of the eyelid does not differ just due to wrinkling, but also depends on the underlying eyeball as seen in image 2050 and 2051. As shown in image 2050 and 2051, the corneal bulge of the eye is visible on the eyelid, even though the eye is fully closed. This can indicate that the subject is looking up. Therefore, detailed spatio-temporal eyelids can be reconstructed.

Figure 21:
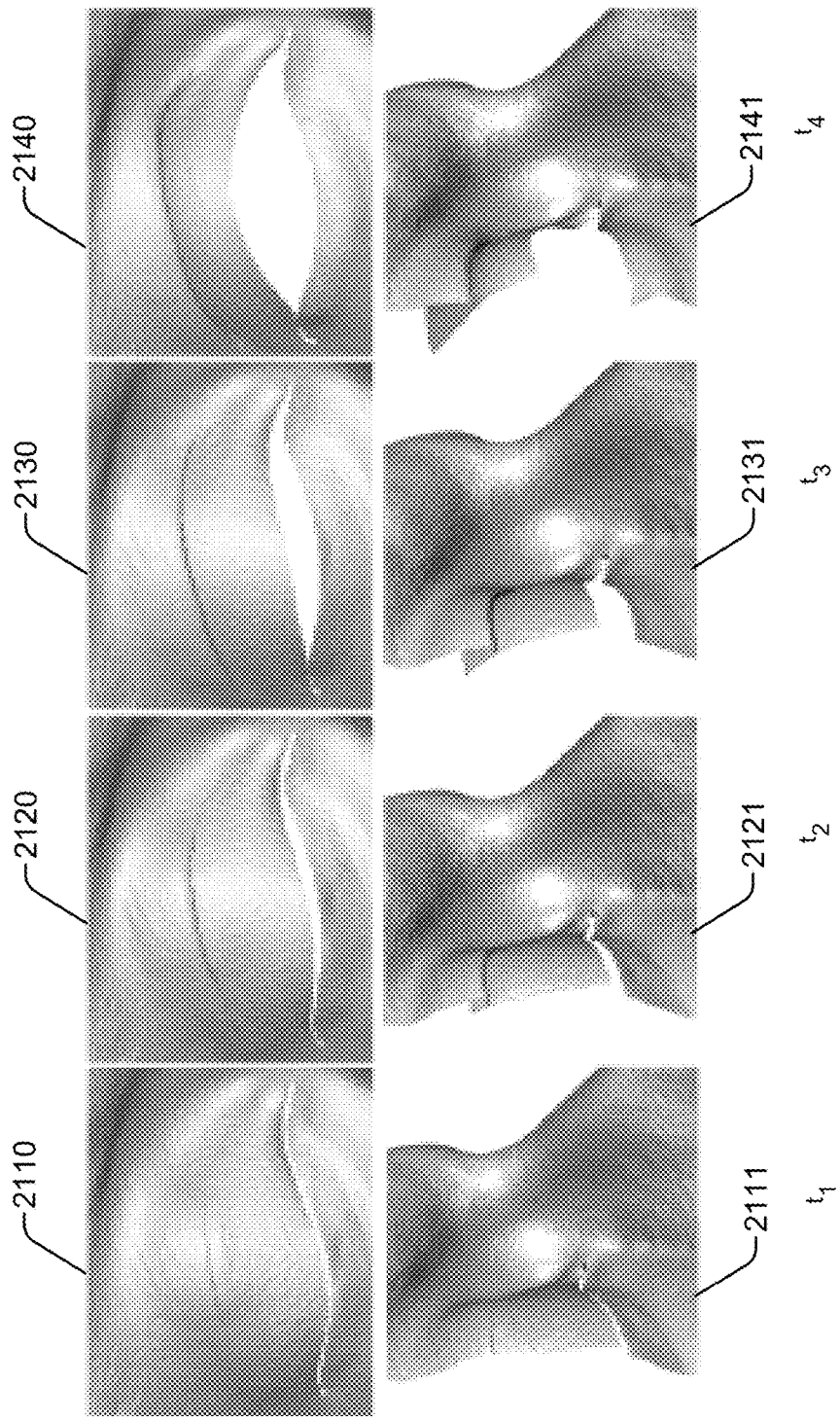

As shown in FIG. 21, eyelid wrinkles exhibit strong variation in their temporal formation. FIG. 21 shows how a wrinkle is formed over times $t_1$ to $t_4$. During wrinkling, skin is folded in a rolling manner. Images 2110, 2120, 2130, and 2140 are images of a front view of reconstructed eyelid which captures the skin folding under and crates a plausible eyelid shape. Images 2111, 2121, 2131, and 2141 are side views of images 2110, 2120, 2130, and 2140, respectively.

Images 2110-2140 and 2111-2141 are images of reconstructed eyelids when the eyelid is opening over time $t_1$ to $t_4$. Time $t_1$ to $t_4$ can span for, for example, two seconds. As shown in image 2110, when the eye is mostly closed, a small wrinkle appears. As the eye opens in images 2120, 2130 and 2140, the size of the wrinkle increased. Images 2111, 2121, 2131, and 2141 show the corresponding same mesh from a side view. Part of the eyelid is cutaway in images 2111, 2121, 2131, and 2141 so the activity inside the eyelid as the eye opens can be seen.

Figure 22:
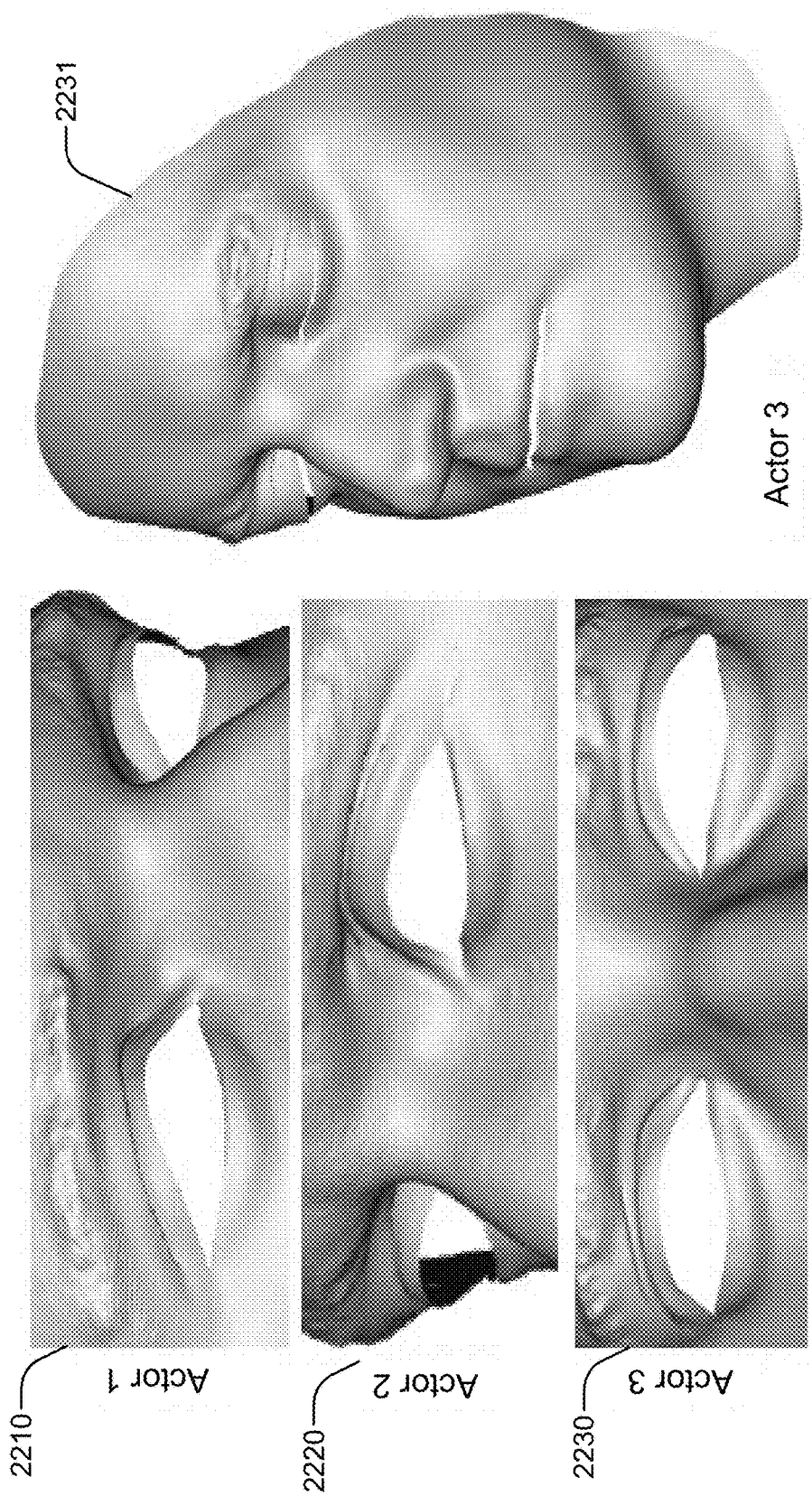

In FIG. 22, images 2210, 2220 and 2230 are reconstructed eyelids for three different actors who have different eyelids. Eyelids can vary in shape between people and even for the same person, the eyelids of one eye can be different from the eyelids of the persons other eye. For example, as shown in images 2220 and 2230 one eye has a single wrinkle and the other eye has double wrinkles. Image 2231 is an image of the reconstructed eyelids 2230 of the third actor which is combined with the high resolution captured face of the third actor. As shown in image 2231, the methods according to the exemplary embodiments provide an eyelid mesh that fits seamlessly into a face mesh.

Figure 23:
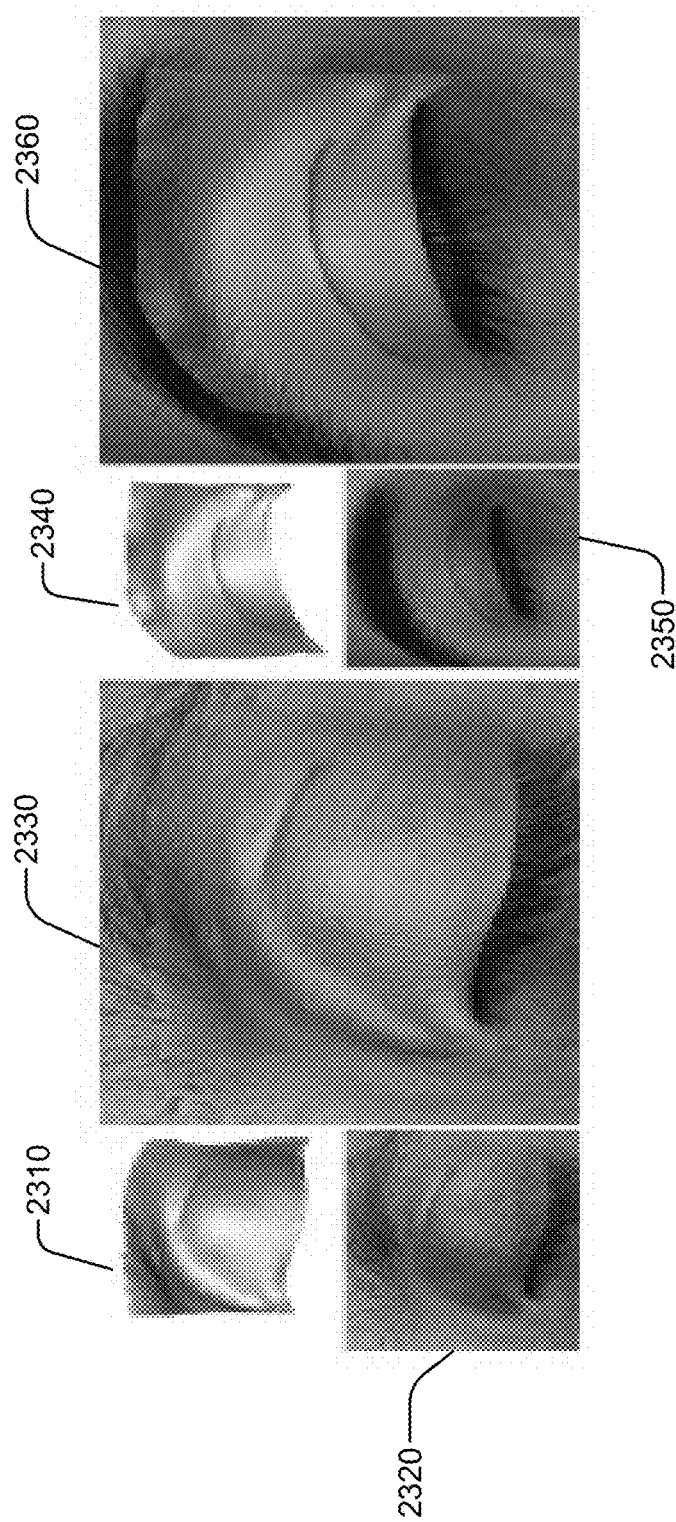

FIG. 23 illustrates overlaying a mesh of a reconstructed eyelid on an input image according to an exemplary embodiment. Image 2310 is a reconstructed eyelid mesh, image 2320 is an input image and image 2330 is an image of reconstructed eyelid mesh 2310 overlaid on the input image 2320. Image 2340 is another example of a reconstructed eyelid mesh, image 2350 is another input image and image 2360 is an image of reconstructed eyelid mesh 2340 overlaid on the input image 2350.

As seen in FIG. 23, the reconstructed eyelid meshes 2310 and 2340 accurately represent the eyelid of the input image. The wrinkles in the reconstructed eyelid mesh 2310 and 2340 accurately aligns with the wrinkles in the input image 2320 and 2350, respectively.

Figure 24:
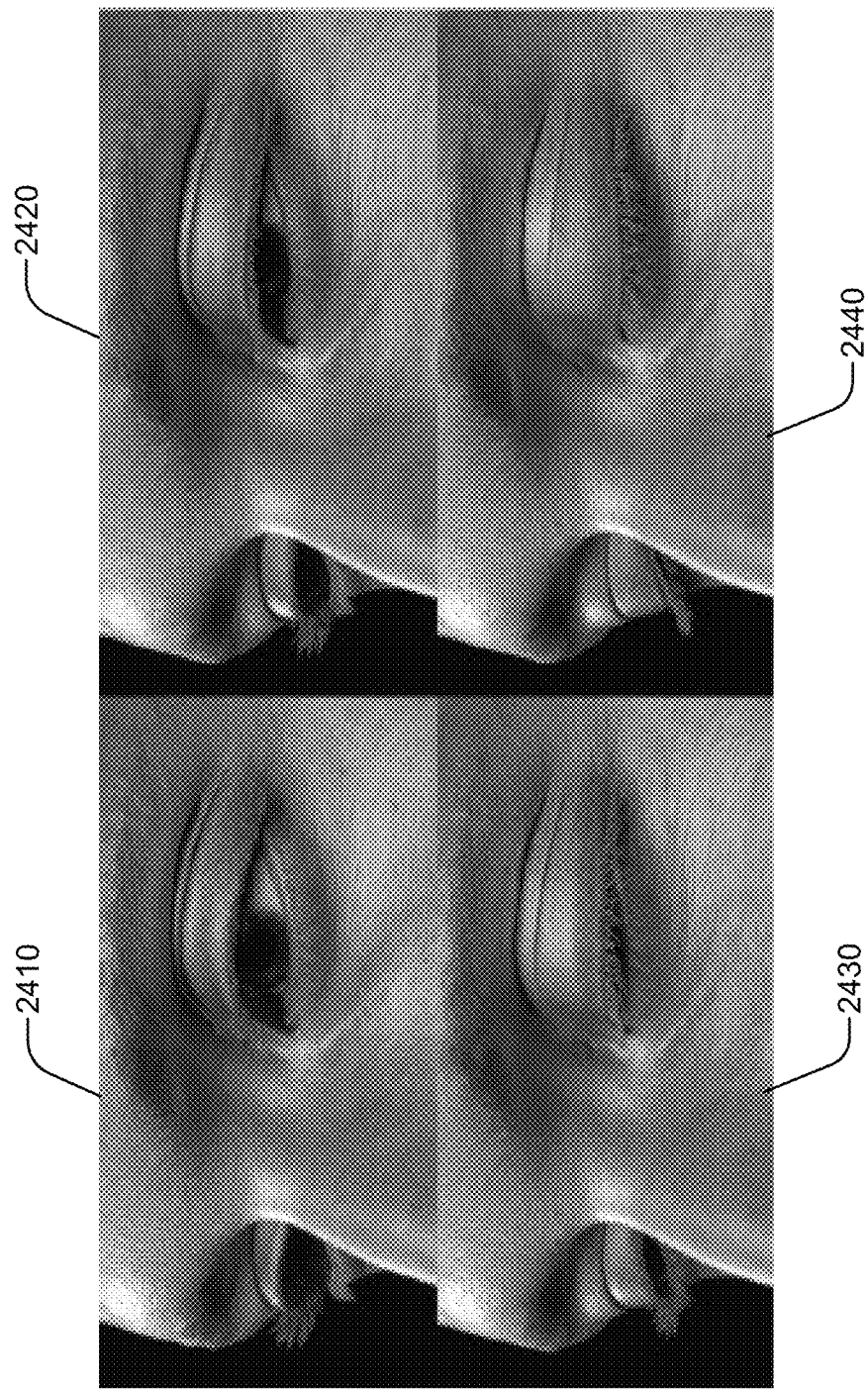

FIG. 24 illustrates reconstructed eyelids, which can used to make high-fidelity digital doubles, according to the exemplary embodiments. That is, the eyelids are used to create a digital double for an actor. Images 2410, 2420, 2430, and 2440 illustrate the reconstructed eyelids in different poses. As shown in FIG. 24, the thin interface, which can be a portion of skin that extends slightly from the reconstructed eyelids towards the eyeball, was sculpted to the eye, and eyelashes and eyes were added to the reconstructed eyelid. The model can be manually completed by sculpting the interface between the eyelid and the eye and well as adding eyelashes.

Figure 25:
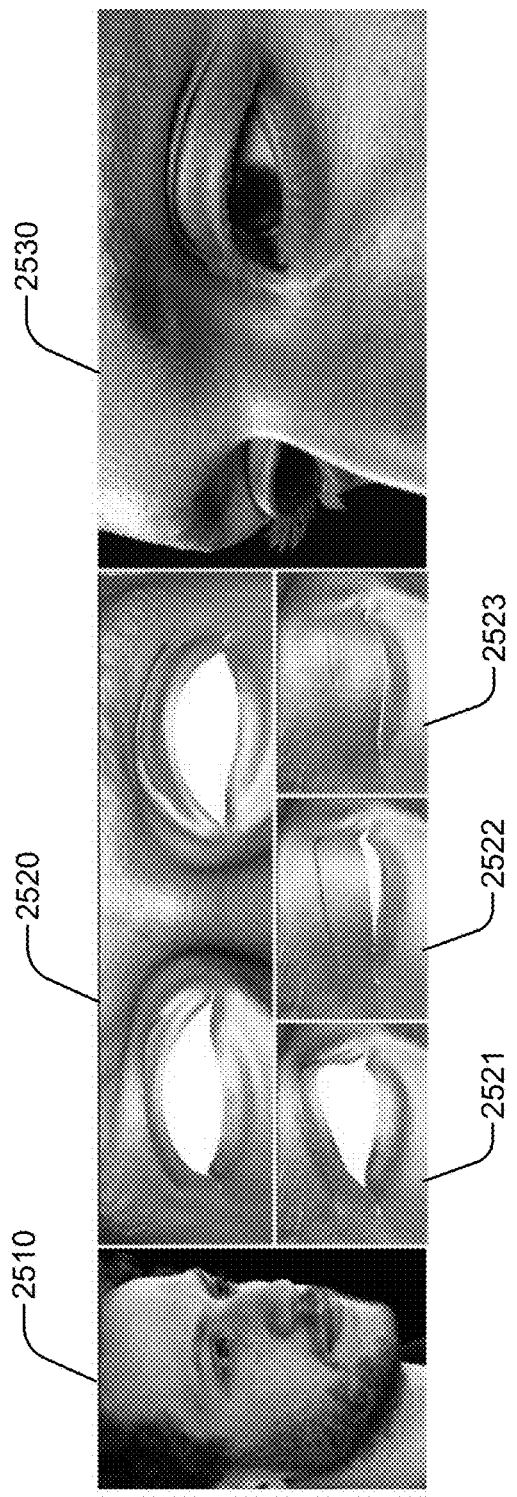

FIG. 25 illustrates an input image 2510 of a subject, reconstructed eyelids 2520, 2521, 2522, and 2523 and the resulting digital double 2530. As showing in FIG. 25, a method according to an exemplary embodiment extends high-resolution facial performance capture with a reconstruction approach that targets the eyelids. Detailed spatio-temporal eyelids 2520, 2521, 2522, and 2523 are reconstructed, even during complex deformation and folding that occur in the eye region. The detailed spatio-temporal eyelids 2520, 2521, 2522, and 2523 can be used to create a high-fidelity digital double 2530.

Therefore, as disclosed in exemplary embodiments, a detailed spatio-temporal eyelid of a subject can be created and used to create a digital double of the subject.

As the eye region is important for conveying emotions, the exemplary embodiments provide expressive facial performances and the creation of realistic digital doubles.

Although the examples have been provided with respect to wrinkling of an eyelid, the exemplary embodiments could be applied to address other forms of wrinkles. By using time varying eyelid capture, the digital representation of the eyelid can be specific to the actor. The exemplary embodiments can reconstruct the eyelid of the subject while taking into account temporal differences and deformations in the eyelid of the subject.

III. Computer System

Figure 26:
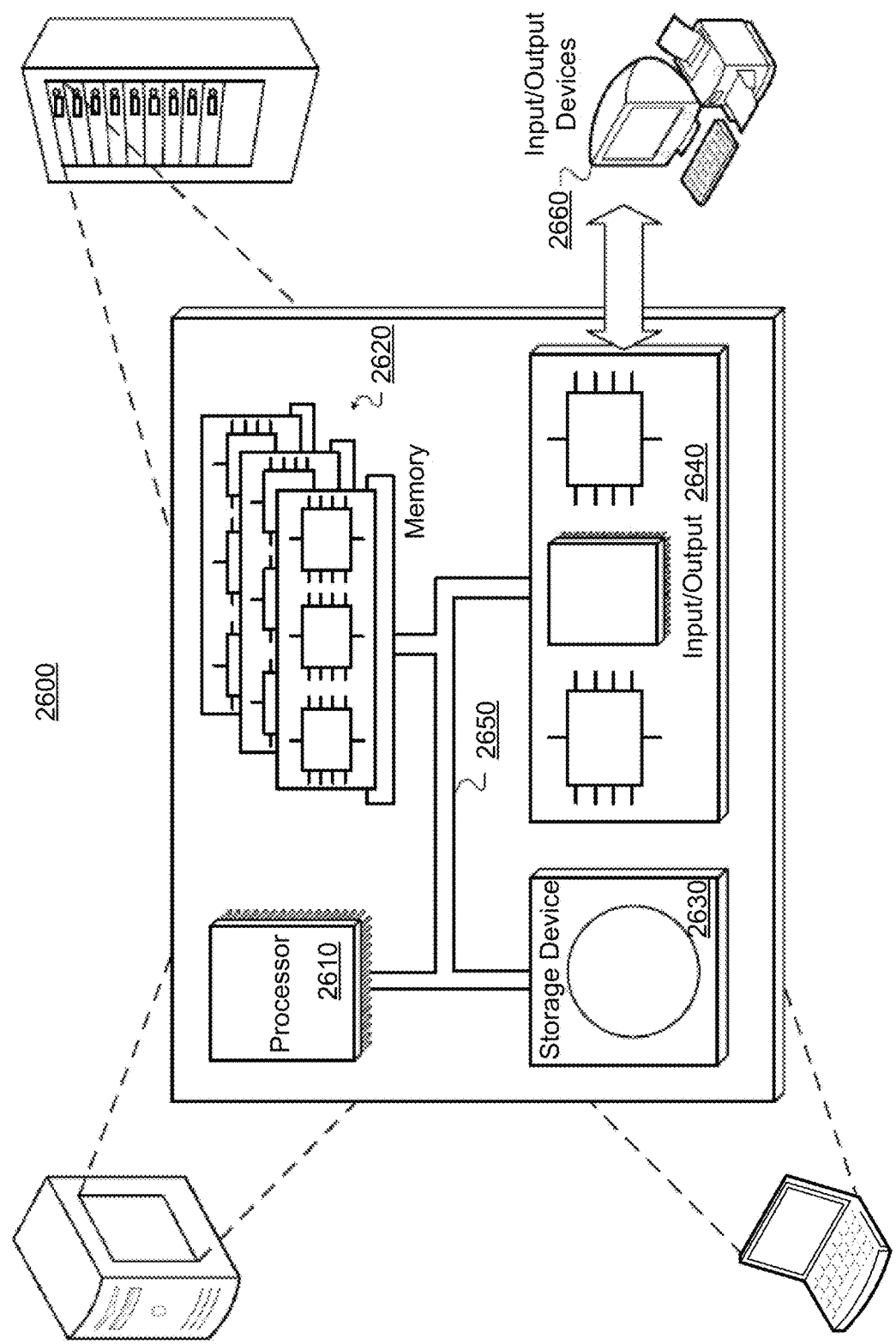
FIG. 26 illustrates an example of a computer system that may be used in various exemplary embodiments.

FIG. 26 illustrates a schematic diagram of an example of a computer system 2600. This system is exemplary only and one having skill in the art will recognize that variations and modifications are possible. The system 2600 can be used for the operations described above. For example, the computer systems shown in FIG. 26 may be used to implement any or all of the techniques and routines described herein.

The system 2600 includes a processor 2610, a memory 2620, a storage device 2630, and an input/output interface 2640. Each of the components 2610, 2620, 2630, and 2640 are interconnected using a system bus 2650. The processor 2610 is capable of processing instructions for execution within the system 2600. In one implementation, the processor 2610 is a single-threaded processor. In another implementation, the processor 2610 is a multi-threaded processor. The processor 2610 is capable of processing instructions stored in the memory 2620 or on the storage device 2630 to provide graphical information via input/output interface 2640 for display on a user interface of one or more input/output device 2660.

The memory 2620 stores information within the system 2600 and may be associated with various characteristics and implementations. For example, the memory 2620 may include various types of computer-readable medium such as volatile memory, a non-volatile memory and other types of memory technology, individually or in combination.

The storage device 2630 is capable of providing mass storage for the system 2600. In one implementation, the storage device 2630 is a computer-readable medium. In various different implementations, the storage device 2630 may be a floppy disk device, a hard disk device, an optical disk device, or a tape device.

The input/output device 2660 provides input/output operations for the system 2600. In one implementation, the input/output device 2660 includes a keyboard and/or pointing device. In another implementation, the input/output device 2660 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computer-implemented method of reconstructing an eyelid comprising:
   obtaining one or more images of the eyelid;
   generating one or more image input data for the one or more images of the eyelid;
   generating one or more reconstruction data for the one or more images of the eyelid, the one or more reconstruction data including one or more eyelid meshes; and
   reconstructing a spatio-temporal digital representation of the eyelid using the one or more input image data and the one or more reconstruction data, wherein reconstructing the spatio-temporal digital representation of the eyelid includes deforming the one or more eyelid meshes using the one or more image input data.

2. The method according to claim 1, wherein the reconstructing the spatio-temporal digital representation of the eyelid comprises:
   tracking a visible skin area of the eyelid; and
   generating a plausible wrinkle area of the eyelid.

3. The method according to claim 2, wherein the tracking the visible skin area of the eyelid comprises deforming the eyelid using one of the optical flow data and the tracked contour data from the one or more image input data.

4. The method according to claim 2, wherein the generating the plausible wrinkle area of the eyelid comprises determining wrinkle feature points of the eyelid by traversing a wrinkle-cross section.

5. The method according to claim 4, wherein the wrinkle feature points comprise a top of the wrinkle, a bottom of the wrinkle, a front-buckle of the wrinkle, a back-buckle top of the wrinkle and a back-buckle bottom of the wrinkle.

6. The method according to claim 2, wherein the tracked contour data is determined by:
generating a plurality of reference contours; and
tracking a contour of the eyelid for the one or more images using at least one of the plurality of reference contours to generate the tracked contour data.

7. The method according to claim 2, wherein the generating the plausible wrinkle area of the eyelid comprises resolving a self-intersection.

8. The method according to claim 1, wherein the one or more image input data comprises at least one or more of a depth map data, a wrinkle probability data, an optical flow data, and a tracked contour data.

9. The method according to claim 8, further comprising generating a wrinkle probability map for the one or more images to create the wrinkle probability data, wherein the wrinkle probability map is configured to identify a probable location of a wrinkle on the eyelid.

10. The method according to claim 9, further comprising:
generating a source-sink map which is configured to identify an optical flow density; and
correcting the optical flow computed from the one or more images using the source-sink map and the wrinkle probability map.

11. The method according to claim 1, wherein the one or more reconstruction data further comprises a face mesh, wherein the face mesh is integrated with the one or more eyelid meshes.

12. A system for reconstructing an eyelid comprising:
a memory storing a plurality of instructions; and
one or more processors configured to:
obtain one or more images of the eyelid;
generate one or more image input data for the one or more images of the eyelid;
generate one or more reconstruction data for the one or more images of the eyelid, the one or more reconstruction data including one or more eyelid meshes; and
reconstruct a spatio-temporal digital representation of the eyelid using the one or more input image data and the one or more reconstruction data, wherein reconstructing the spatio-temporal digital representation of the eyelid includes deforming the one or more eyelid meshes using the one or more image input data.

13. The system according to claim 12, wherein the reconstructing the spatio-temporal digital representation of the eyelid comprises:
tracking a visible skin area of the eyelid; and
generating a plausible wrinkle area of the eyelid.

14. The system according to claim 13, wherein the one or more image input data comprises at least one or more of a depth map data, a wrinkle probability data, an optical flow data, and a tracked contour data.

15. The system according to claim 14, wherein the tracking the visible skin area of the eyelid comprises deforming the eyelid using one of the optical flow data and the tracked contour data from the one or more image input data.

16. The system according to claim 14, further comprising one or more processors configured to generate a wrinkle probability map for the one or more images to create the wrinkle probability data, wherein the wrinkle probability map is configured to identify a probable location of a wrinkle on the eyelid.

17. The system according to claim 13, wherein the one or more reconstruction data further comprises a face mesh, wherein the face mesh is integrated with the one or more eyelid meshes.

18. The system according to claim 13, wherein the generating the plausible wrinkle area of the eyelid comprises determining wrinkle feature points of the eyelid by traversing a wrinkle-cross section.

19. A computer-readable memory storing a plurality of instructions executable by one or more processors, the plurality of instructions comprising:
instructions that cause the one or more processors to obtain one or more images of the eyelid;
instructions that cause the one or more processors to generate one or more image input data for the one or more images of the eyelid;
instructions that cause the one or more processors to generate one or more reconstruction data for the one or more images of the eyelid, the one or more reconstruction data including one or more eyelid meshes; and
instructions that cause the one or more processors to reconstruct a spatio-temporal digital representation of the eyelid using the one or more input image data and the one or more reconstruction data, wherein reconstructing the spatio-temporal digital representation of the eyelid includes deforming the one or more eyelid meshes using the one or more image input data.

20. The computer-readable memory according to claim 19, wherein the reconstructing the spatio-temporal digital representation of the eyelid comprises:
tracking a visible skin area of the eyelid; and
generating a plausible wrinkle area of the eyelid.

* * * * *

UNITED STATES PATENT AND TRADEMARK OFFICE
CERTIFICATE OF CORRECTION

PATENT NO. : 9,691,165 B2
APPLICATION NO. : 14/809122
DATED : June 27, 2017
INVENTOR(S) : Amit Bermano et al.

Page 1 of 1

It is certified that error appears in the above-identified patent and that said Letters Patent is hereby corrected as shown below:

On the Title Page

Item (73), subsection ASSIGNEES:
Replace "Disney Enterprises, Inc., Burbank, CA (US); ETH Zürich (Eidgenossische Technische Hochschule Zürich), Zürich (CH)" with --Disney Enterprises, Inc., Burbank, CA (US); ETH Zürich (Eidgenössische Technische Hochschule Zürich), Zürich (CH)--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*